United States Patent
Tharp

(10) Patent No.: US 6,998,730 B2
(45) Date of Patent: Feb. 14, 2006

(54) HYDRO-ELECTRIC FARMS

(76) Inventor: John E. Tharp, 7278 Lake Dr., SW., Fort Myers, FL (US) 33908

( * ) Notice: Subject to any disclaimer, the term of this patent is extended or adjusted under 35 U.S.C. 154(b) by 0 days.

(21) Appl. No.: 11/198,727

(22) Filed: Aug. 5, 2005

(65) Prior Publication Data

US 2005/0285405 A1    Dec. 29, 2005

Related U.S. Application Data

(62) Division of application No. 10/754,255, filed on Jan. 9, 2004.

(60) Provisional application No. 60/458,488, filed on Mar. 28, 2003.

(51) Int. Cl.
*H02K 1/22*    (2006.01)
*F03B 1/00*    (2006.01)

(52) U.S. Cl. .......................... 290/54; 310/54; 310/261; 415/3.1; 290/52

(58) Field of Classification Search .................. 290/42, 290/43, 44, 52, 53, 54, 55; 310/54, 261; 415/3.1
See application file for complete search history.

(56) References Cited

U.S. PATENT DOCUMENTS

| | | |
|---|---|---|
| 365,133 A | 6/1887 | Kessler |
| 400,209 A | 3/1889 | Haskins |
| 966,042 A | 8/1910 | McClung |
| 966,794 A | 9/1910 | Miner |
| 1,123,491 A | 1/1915 | Corbin |
| 2,501,696 A | 3/1950 | Souczek |
| 3,334,254 A | 8/1967 | Kober |
| 3,418,506 A | 12/1968 | Parker |
| 3,513,340 A | 5/1970 | Appleton |
| 3,823,919 A | 7/1974 | Benedikter |
| 3,896,753 A | 7/1975 | Shepherd et al. |
| 3,973,864 A | 8/1976 | Atherton |
| 3,980,894 A | 9/1976 | Vary et al. |
| 3,986,787 A | 10/1976 | Mouton, Jr. et al. |
| 3,992,125 A | 11/1976 | Schilling |
| 3,994,134 A | 11/1976 | Molnar |
| 4,009,677 A | 3/1977 | Croisant |
| 4,023,041 A | 5/1977 | Chappell |
| 4,025,220 A | 5/1977 | Thompson et al. |
| 4,038,821 A | 8/1977 | Black |
| 4,048,947 A | 9/1977 | Sicard |

(Continued)

OTHER PUBLICATIONS

Chris Lang, "Harnessing Tidal Energy Takes New Turn," Marine Current Turbines, one page (p. no. unknown), date unknown, USA.

*Primary Examiner*—Nicholas Ponomarenko
(74) *Attorney, Agent, or Firm*—Dennis G. Lapointe

(57) ABSTRACT

An underwater hydroelectric farm comprising a plurality of electrical generator assemblies arranged in an array on a bottom surface of a body of water within an ocean current path to take generate power from a kinetic energy caused by the flow of the underwater current. Each assembly is installed in a cradle, which is anchored with a pile driven system to the bottom surface. Each assembly is a modular system allowing for easy swapping out of an assembly under water. Generated power is transmitted to a land based facility directly to or through an intermediate transfer station. Generator portion may have internally or externally supported field windings. Various configurations of propellers may be used, some with channels or solid vanes and another being a spiral shaped propeller. All water exposed surfaces of the generator and propeller portions are coated with a non-conductive, heat dissipating, anti-fouling and water specific protective coating.

10 Claims, 20 Drawing Sheets

U.S. PATENT DOCUMENTS

| | | |
|---|---|---|
| 4,092,828 A | 6/1978 | Garza |
| 4,095,918 A | 6/1978 | Mouton, Jr. et al. |
| 4,134,710 A | 1/1979 | Atherton |
| 4,137,005 A | 1/1979 | Comstock |
| 4,140,433 A | 2/1979 | Eckel |
| 4,163,904 A | 8/1979 | Skendrovic |
| 4,163,905 A | 8/1979 | Davison |
| 4,174,923 A | 11/1979 | Williamson |
| 4,203,702 A | 5/1980 | Williamson |
| 4,205,943 A | 6/1980 | Vauthier |
| 4,219,303 A | 8/1980 | Mouton, Jr. et al. |
| 4,256,970 A | 3/1981 | Tomassini |
| 4,275,680 A | 6/1981 | Pennington, III et al. |
| 4,306,157 A | 12/1981 | Wracsaricht |
| 4,313,059 A | 1/1982 | Howard |
| 4,329,277 A | 5/1982 | Murphy |
| 4,335,093 A | 6/1982 | Salomon |
| 4,335,319 A | 6/1982 | Mettersheimer, Jr. |
| 4,358,693 A | 11/1982 | Palmer et al. |
| 4,371,801 A | 2/1983 | Richter |
| 4,382,190 A | 5/1983 | Jacobson |
| 4,383,182 A | 5/1983 | Bowley |
| 4,383,797 A | 5/1983 | Lee |
| 4,389,034 A | 6/1983 | Suttles |
| 4,392,073 A | 7/1983 | Rosenberry, Jr. |
| 4,437,892 A | 3/1984 | Kelsey |
| 4,467,218 A | 8/1984 | Andruszkiw et al. |
| 4,468,153 A | 8/1984 | Atencio et al. |
| 4,499,407 A | 2/1985 | MaCleod |
| 4,503,349 A | 3/1985 | Miller |
| 4,520,273 A | 5/1985 | Rowe |
| 4,521,349 A | 6/1985 | Weber et al. |
| 4,524,285 A | 6/1985 | Rauch |
| 4,529,784 A | 7/1985 | Finlay |
| 4,551,066 A | 11/1985 | Frisz |
| 4,575,282 A | 3/1986 | Pardue |
| 4,613,279 A | 9/1986 | Corren |
| 4,619,593 A | 10/1986 | Molnar |
| 4,661,716 A | 4/1987 | Chu |
| 4,667,137 A | 5/1987 | Macleod |
| 4,684,817 A | 8/1987 | Goldwater |
| 4,686,376 A | 8/1987 | Retz |
| 4,694,045 A | 9/1987 | Moore |
| 4,748,808 A | 6/1988 | Hill |
| 4,792,237 A | 12/1988 | Hara |
| 4,804,439 A | 2/1989 | Fredriksson |
| 4,818,888 A | 4/1989 | Lenoir, III |
| 4,839,456 A | 6/1989 | Kent |
| 4,843,249 A | 6/1989 | Bussiere |
| 4,850,190 A | 7/1989 | Pitts |
| 4,937,485 A * | 6/1990 | Mihalko .................... 310/208 |
| 4,937,930 A | 7/1990 | Humenik et al. |
| 5,017,322 A | 5/1991 | Brooks |
| 5,028,453 A | 7/1991 | Jeffrey et al. |
| 5,037,677 A | 8/1991 | Halpern et al. |
| 5,064,928 A | 11/1991 | Kase et al. |
| 5,100,290 A * | 3/1992 | Berger .................... 415/60 |
| 5,117,141 A | 5/1992 | Hawsey et al. |
| 5,120,816 A | 6/1992 | Gould et al. |
| 5,192,603 A | 3/1993 | Slater et al. |
| 5,194,504 A | 3/1993 | Lebovits et al. |
| 5,266,006 A | 11/1993 | Tsui et al. |
| 5,286,921 A | 2/1994 | Fontaine et al. |
| 5,334,899 A * | 8/1994 | Skybyk .................... 310/268 |
| 5,372,617 A | 12/1994 | Kerrebrock |
| 5,378,510 A | 1/1995 | Thomas et al. |
| 5,440,176 A | 8/1995 | Haining |
| 5,491,366 A | 2/1996 | Newman |
| RE35,165 E | 3/1996 | Seng |
| 5,648,416 A | 7/1997 | Miller et al. |
| 5,652,027 A | 7/1997 | Brady, Jr. et al. |
| 5,661,259 A | 8/1997 | Cipolla |
| 5,674,561 A | 10/1997 | Dietz et al. |
| 5,682,072 A | 10/1997 | Takahashi |
| 5,798,572 A | 8/1998 | Lehoczky |
| 5,834,853 A | 11/1998 | Ruiz et al. |
| 5,918,360 A | 7/1999 | Forbes et al. |
| 5,937,644 A | 8/1999 | Dipnall |
| 5,985,983 A | 11/1999 | Yamada et al. |
| 6,006,518 A | 12/1999 | Geary |
| 6,011,334 A | 1/2000 | Roland |
| 6,064,123 A | 5/2000 | Gislason |
| 6,091,161 A | 7/2000 | Dehlsen et al. |
| 6,100,600 A * | 8/2000 | Pflanz .................... 290/54 |
| 6,104,097 A | 8/2000 | Lehoczky |
| 6,109,863 A | 8/2000 | Milliken |
| 6,168,373 B1 | 1/2001 | Vauthier |
| 6,177,735 B1 | 1/2001 | Chapman et al. |
| 6,310,406 B1 | 10/2001 | Van Berkel |
| 6,327,994 B1 | 12/2001 | Labrador |
| 6,329,042 B1 | 12/2001 | Yamada et al. |
| 6,329,469 B1 | 12/2001 | Bowers et al. |
| 6,365,984 B1 | 4/2002 | Shu |
| 6,373,161 B1 * | 4/2002 | Khalaf .................... 310/154.02 |
| 6,409,466 B1 | 6/2002 | Lamont |
| 6,417,578 B1 | 7/2002 | Chapman et al. |
| 6,472,768 B1 | 10/2002 | Salls |
| 6,518,680 B1 | 2/2003 | McDavid, Jr. |
| 6,531,788 B1 | 3/2003 | Robson |
| 6,537,608 B1 | 3/2003 | Miller et al. |
| 6,664,339 B1 | 12/2003 | Schmiegel |
| 6,856,036 B1 | 2/2005 | Belinsky |
| 6,943,478 B1 * | 9/2005 | Zepp et al. .................... 310/191 |
| 2002/0034437 A1 | 3/2002 | Williams |
| 2002/0158472 A1 | 10/2002 | Robson |
| 2003/0106602 A1 | 6/2003 | Hsich et al. |
| 2003/0113464 A1 | 6/2003 | Fukushi et al. |
| 2003/0118765 A1 | 6/2003 | Govaerts et al. |
| 2003/0125421 A1 | 7/2003 | Bladel et al. |
| 2003/0157336 A1 | 8/2003 | Kinoshita et al. |
| 2003/0174994 A1 | 9/2003 | Garito et al. |
| 2003/0193198 A1 | 10/2003 | Wobben |
| 2003/0207103 A1 | 11/2003 | Zvosec et al. |
| 2003/0207118 A1 | 11/2003 | Fukushi |
| 2003/0207986 A1 | 11/2003 | Wang |
| 2004/0013510 A1 | 1/2004 | Williams |
| 2004/0018312 A1 | 1/2004 | Halladay |

\* cited by examiner

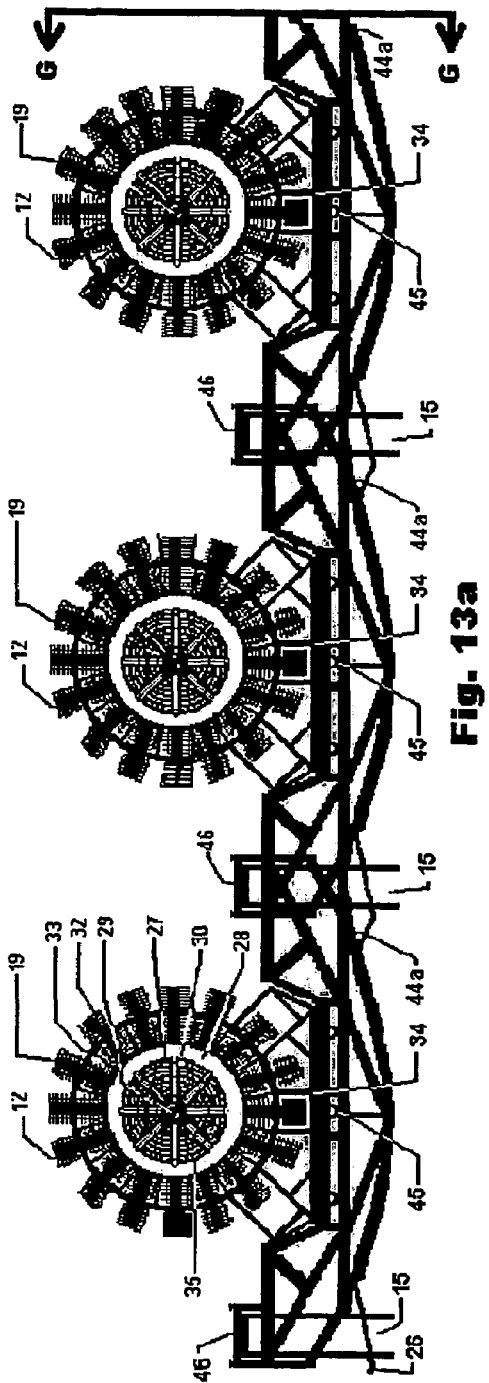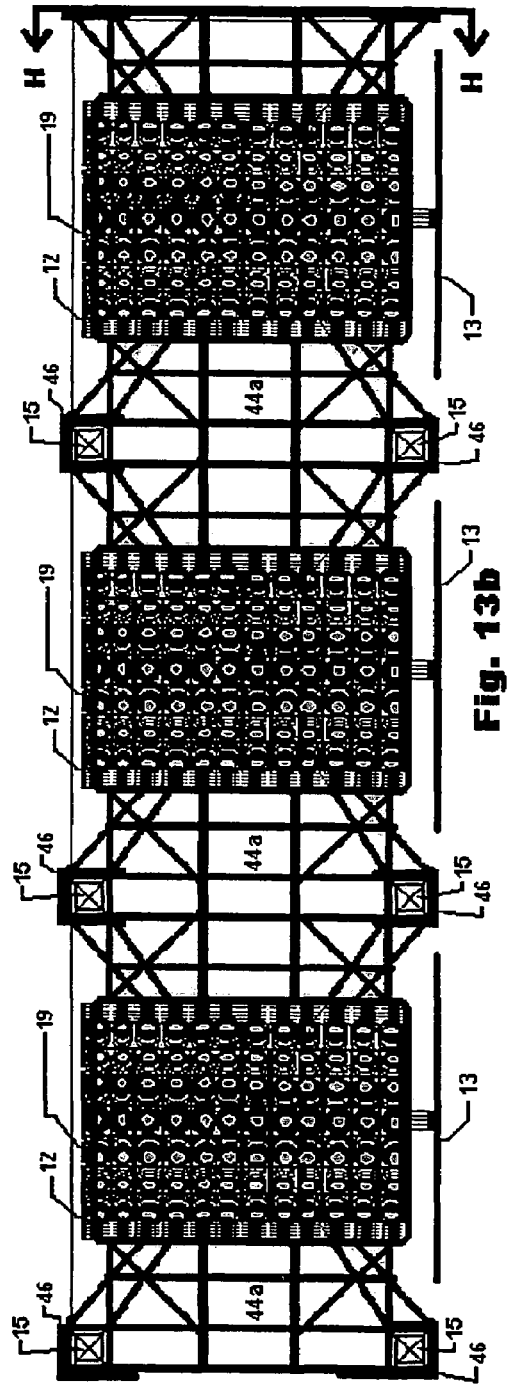
Fig. 13a
Fig. 13b

HYDRO-ELECTRIC FARMS

RELATED APPLICATION

This application is a divisional application of co-pending application Ser. No. 10/754,255 filed Jan. 9, 2004 which claims the benefit of Provisional Application No. 60/458,488, filed Mar. 28, 2003.

FIELD OF THE INVENTION

The invention is related to underwater ocean current Hydro-Electric farms and the electrical generators used for such farms.

BACKGROUND OF THE INVENTION

The problem with underwater ocean current flow power conversion to electric energy up to now has been that the electric generators had to be shielded from the ocean water, either by placing them above the surface of the water or enclosing them in watertight containers.

SUMMARY OF THE INVENTION

What is needed is a new and unique invention that can use a direct ocean water immersion type of electrical generator. These generators can incorporate either an internal framework with the stator wire coils attached to and wound around this framework, which can then support this new assembly, or the more conventional exterior supported coil wire arrangement, sometimes known as the clamshell type arrangement.

The exterior and interior surfaces of this new generator is coated with a new combination of composite layers to form a non-conductive, heat dissipating, anti-fouling, caustic water environment specific, protective coating thus allowing the entire apparatus sustained immersion in the ocean water.

These generators are designed to allow the ocean current to pass through their shapes to further aid in heat dissipation. Air based generators are limited by heat in the amount of electrical current they produce. In this invention, by allowing the water to flow around the windings and increase the generated heat dispersion, it can produce larger amounts of electric current from the same size generator with industry standard windings.

These electrical generators could also incorporate the use of a brush-less design, whereas the rotator components are never actually in contact with the stator assembly. The extended life of each unit and each individual component is one of the overall design goals of this invention.

These electric generators are self-contained and modular in aspect. Replacement of most components involves the removal of the entire electrical generator and turbine blade/propeller assemblies and plugging in a replacement combined unit. Service of the combined units can be on either specially equipped ships and/or serviced on the mainland, depending upon the extent of the repairs required. Spare assemblies can be ready in advance to facilitate removal and replacement of malfunctioning units with a minimum of downtime. The Hydro-Electric Farm as a whole only loses the generating capacity of the individual assembly that is being replaced.

This plug-in unit capacity can only be accomplished with the generator-supporting replacement-friendly cradles. These cradles are pre-assembled, transported to the site location and then lowered into position ready to receive the generator assemblies. Cradles are attached to the ocean bottom with pile anchors. They can be driven, mechanically or power charged, augured or vibrated into position.

Placement of the electric generators minimizes environmental and boat traffic concerns. Other placement criteria include: a) degree of slope of the bottom which could be anywhere between vertical and horizontal, b) actual composition of the bottom, c) placement proximity to final use of the generated electricity, d) location of optimum constant ocean current.

The electric generators are powered by a composite turbine blade/propeller that converts the ocean current's kinetic energy into rotational force. The rotational blades are large and slow moving, but with substantial torque, this kinetic energy then is applied to the rotational shaft on which they turn. This shaft is coupled to, or is a part of, a gear up rotational enhancer to maximize the electric generator's output. These turbine blade/propeller assemblies are constructed of either non-corroding metals, space age composite materials and/or coated with a protective type coating similar to that used on the electric generators.

The metals incorporated in the design of these electric generating units and in their cradle design are preferably non-corroding alloy metals.

The power transmission lines from each Hydro-Electric Farm converges and unifies and then is routed to the mainland under land and water surface thru directional drilled conduits. The advantages of this arrangement are numerous. The described turbine blade/propeller driven electric generator, cradle, anchoring piles and transmission lines are located in plural. Directional drilling from the mainland sites places the transmission line conduit under the mainland and ocean surface.

The power control equipment, voltage regulators, converters and accumulators are located inland and adjacent to the conventional power grid system.

This invention and process is composed of predominately new art coupled with some prior art combined in a unique and exciting new manner to produce renewable electric energy from ocean currents. This new combination includes, but is not limited to: totally immersed electric generators powered by ocean currents that have new internal structures and support components, coated with non-conductive, heat dissipating, anti-fouling, water environment specific, protective coatings, employment of new turbine blade/propellers, (multiple styles are shown), setting of these submerged generators, (two types are shown), on pre-constructed cradles, (two types are shown), anchoring of these cradles in the current's flow, constructing the generator and turbine blade/propeller as a combined replaceable unit, employing directional drilling to route the transmission cables, using water specific electric cable types, employing a junction platform (transfer station) for mid ocean deployment, and grouping these electric generators in multiple placement formations that are known as Hydro-Electric Farms.

BRIEF DESCRIPTION OF THE DRAWINGS

FIG. 13a is a front view of the extended open web cradle with the internal supported electric generators arranged side by side. The cut line (G—G) has abbreviated the length of the extended cradle in the drawing;

FIG. 13b is a plan view of the extended open web cradle system showing placement of the internal supported electric generators arranged side by side. The cut line (H—H) has abbreviated the length of the extended cradle in the drawing;

DETAILED DESCRIPTION OF THE INVENTION

Figure 1:
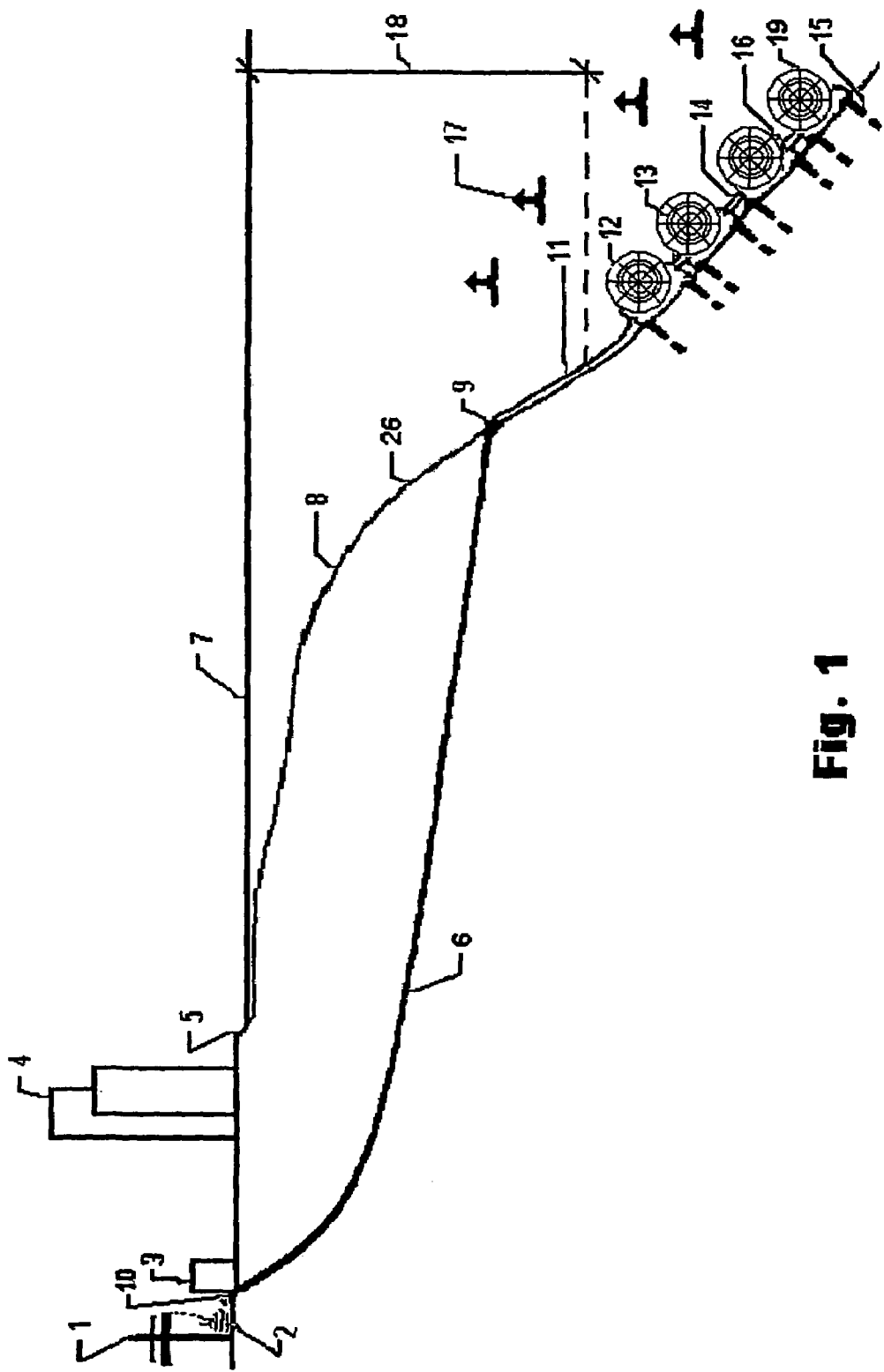
FIG. 1 is a Cross-Sectional View of an Adjacent Site Hydro-Electric Farm.

FIG. 1: Cross Section View of an Adjacent Site Hydro-Electric Farm. Shown in this view is the direct immersion type of electrical generator 12. The exterior and interior surfaces of this generator is coated with a protective covering 19. Also shown are the composite turbine blade/propellers 13, the ocean current 17, pre-assembled cradle 16 and the pile type devices 15. This anchoring system can be used either horizontally into the side of the underwater channel drop-offs 8 or vertically into the bottom of the current channels 26. The layout of the multiple generators is based on current flow 17 and the required design minimum depth 18 for the generator assemblies 12/13, from the ocean surface 7.

The power transmission lines to the mainland are via under water transmission cables 11 that are pulled thru the directional drilled conduits 6. Close to the mainland, these transmission lines are routed through the entrances 9 of the conduits 6, to sites set well back from the coastline 5 and the shoreline buildings 4. These conduits emerge at 10 which is where the power regulators and conversion equipment (also referred herein as control segment) 3 is housed, and the standard mainland transformers 2 and transmission lines 1 are located.

The described electric generators 12 are located in plurality in an array arrangement. Control wirings 14 interconnect these multiple electric generators 12.

Figure 2:
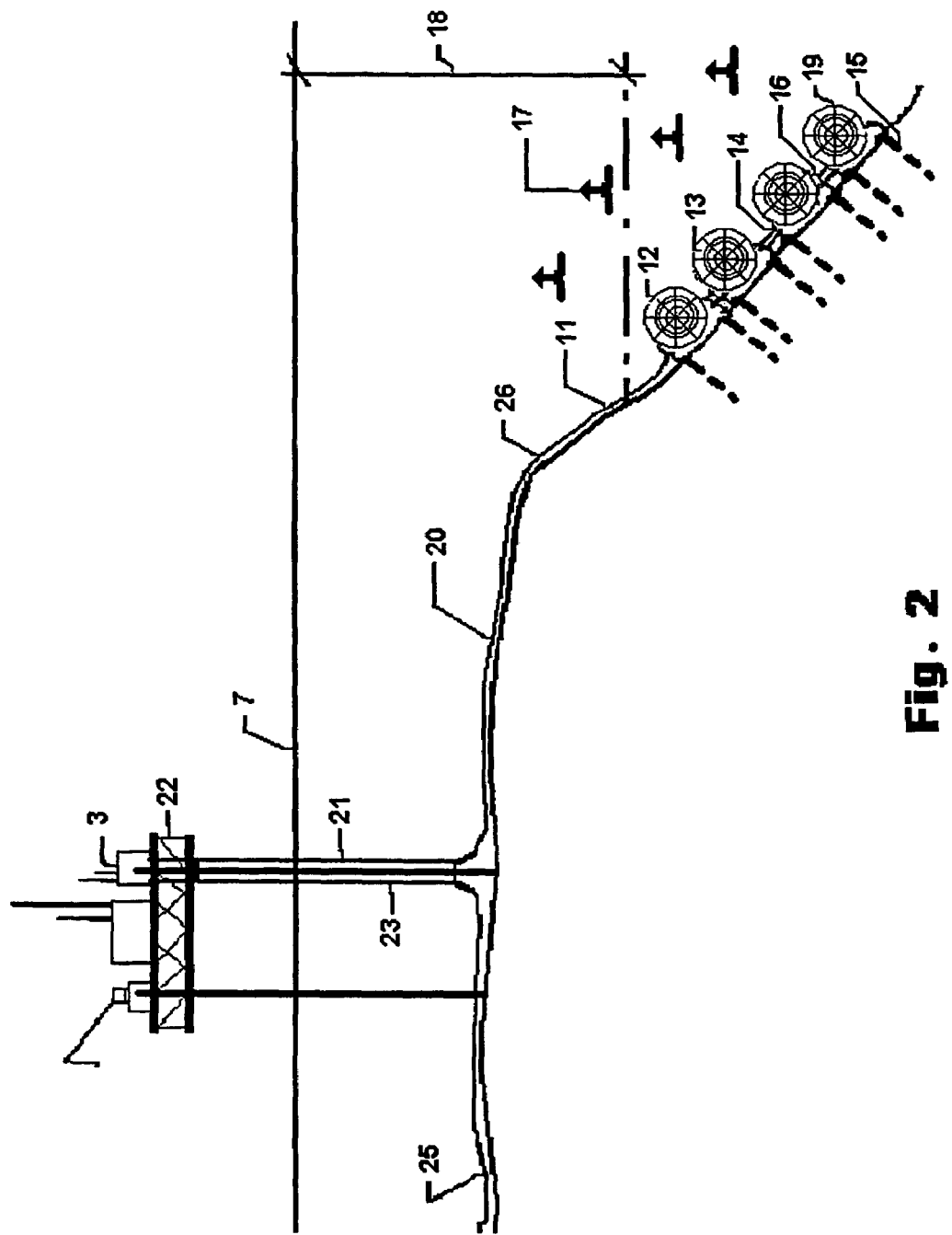
FIG. 2 is another embodiment of the invention in cases where the ocean currents are not directly adjacent to the mainland, in which an intermediate platform (transfer station) is incorporated where the platform is bottom supported. Alternatively, the transfer station may be of a submersible, or semi-submersible type structure, or a combination of the three types.

FIG. 2: In areas of the world where the ocean currents are not directly adjacent to the mainland, there can be placed an intermediate junction platform (transfer station) 22, somewhat like the modern oil drilling platform, in which the platform may be bottom supported, as shown in FIG. 2, or of a submersible type, or semi-submersible type structure, or a combination of the above types, depending upon the depth of the ocean current 18 from the surface 7, the conditions of the bottom, and other factors. These platforms collect and transform the harvested electricity into the proper configuration for long distance transmission to the mainland. The incoming, direct bottom laid, power accumulated transmission line 20 is routed up the platform 21 and then converted in the control segment 3 of the platform 22 to long distance transmission configuration. The power is then routed back down the platform 23 and to the mainland via the ocean bottom laid transmission cables 25. When this cable 25 reaches proximity to the coastline it can then be routed into the same type of conduit opening 9 located in the naturally occurring ocean bottom 8, thru the incoming conduit 6, along with or be transformed into, part of the standard transmission cable 11, and then up to the above ground emergence point 10. The rest of the generation, collection, combining and transmission aspects of the collective Hydro-Electric Farm as depicted in FIG. 1, will apply to finally feeding the electricity generated into the mainland electric power grids 1. We have not retraced the common and identical components in both FIG. 1 and FIG. 2, as they are similar and the concepts are alike. The conduit 6 may be shorter or longer based on the particular generating site's ocean bottom characteristics and location of the mainland emerging point 10, its distance from the underwater conduit pull point 9, which is influenced by the ocean bottom depth 8. The control wiring and generator monitoring functions are handled from the adjacent platform 22, rather than from the mainland site as in FIG. 1. The overall electric generating principles apply in FIG. 1 and FIG. 2.

Figure 2A:
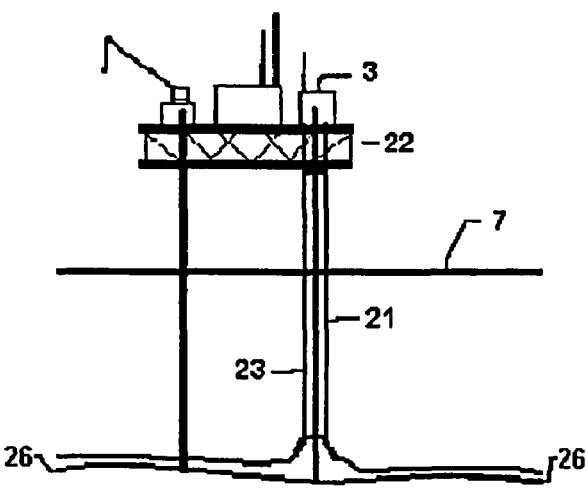
FIG. 2a is a side view of the conventional bottom supported intermediate platform.

FIG. 2a: This is a side view of the standard intermediate junction platform that is bottom supported. This has been discussed in length above. The permanent built in place bottom supported platforms are well known in the oil drilling art.

Figure 2B:
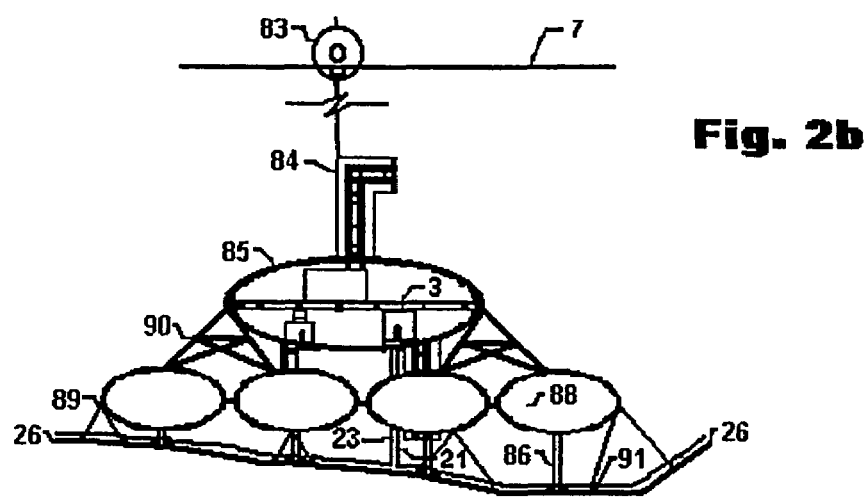
FIG. 2b is a side view of the a submersible type intermediate platform.

FIG. 2b: This is a side view of a typical towed into place submersible intermediate junction platform that becomes tethered to the bottom in a semi-permanent placement. The drawing shows the exterior skin removed to reveal the interior spaces. The surface buoy for communications, anchorage of junction platform servicing ships and location of the submersible junction platform is shown as 83. The docking port for underwater submersible craft to supply men and materials to the submersed junction platform is shown as 84. The main temporary living, material storage and equipment areas are shown as 85. The water filled stabilizing pontoons or ballast chambers are denoted as 88. The structural cross bracing members bracing and tying the main junction platform chamber with the ballast chambers are shown as 90. The submersible platform's bottom tethers are shown as 89. The submersible platform's bottom support struts are shown as 86. The tether bottom anchorage points are shown as 91. The bottom is shown as 26. The power from the Hydro-Electric Farm being serviced is routed into the submersible platform and is shown as 21. The electrical transformation equipment in the control segment is shown as 3. The configured outgoing power is then routed out of the structure 23 to the outgoing transmission lines to the mainland. These submersible platforms are known in the deep-sea exploration and the under sea habitat art. This is a new and unique use for this technology.

Figure 2C:
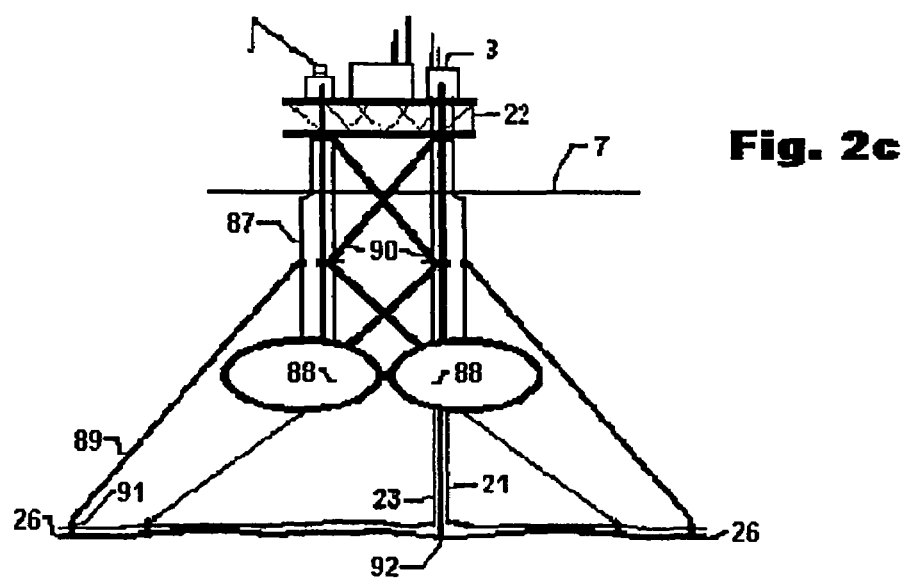
FIG. 2c is a side view of the a semi-submersible type intermediate platform.

FIG. 2c: This is a side view of a semi-submersible intermediate junction platform. These intermediate junction platforms are typically towed to remote ocean locations. Quite often these intermediate junction platforms 2c are placed over very deep water. The design allows for the hollow pylons and pontoons to be filled with water thus sinking them under the surface of the ocean. This feature allows for the junction platform to remain steady even in sever weather. The water filled pylons are shown as 87 and the connecting water filled pontoons are shown as 88. The tether lines to the bottom are shown as 89 and the bottom anchoring points are shown as 91. The structural cross members bracing the platform 22 above and between the pylons 87 and the pontoons 88 is shown in this drawing by the designation of 90. The stabilizing conduit for the incoming electrical cables 21 and the outgoing cables 23 is shown as 92 in this drawing. These deep-water platforms are also known in the oil drilling art.

Figure 3:
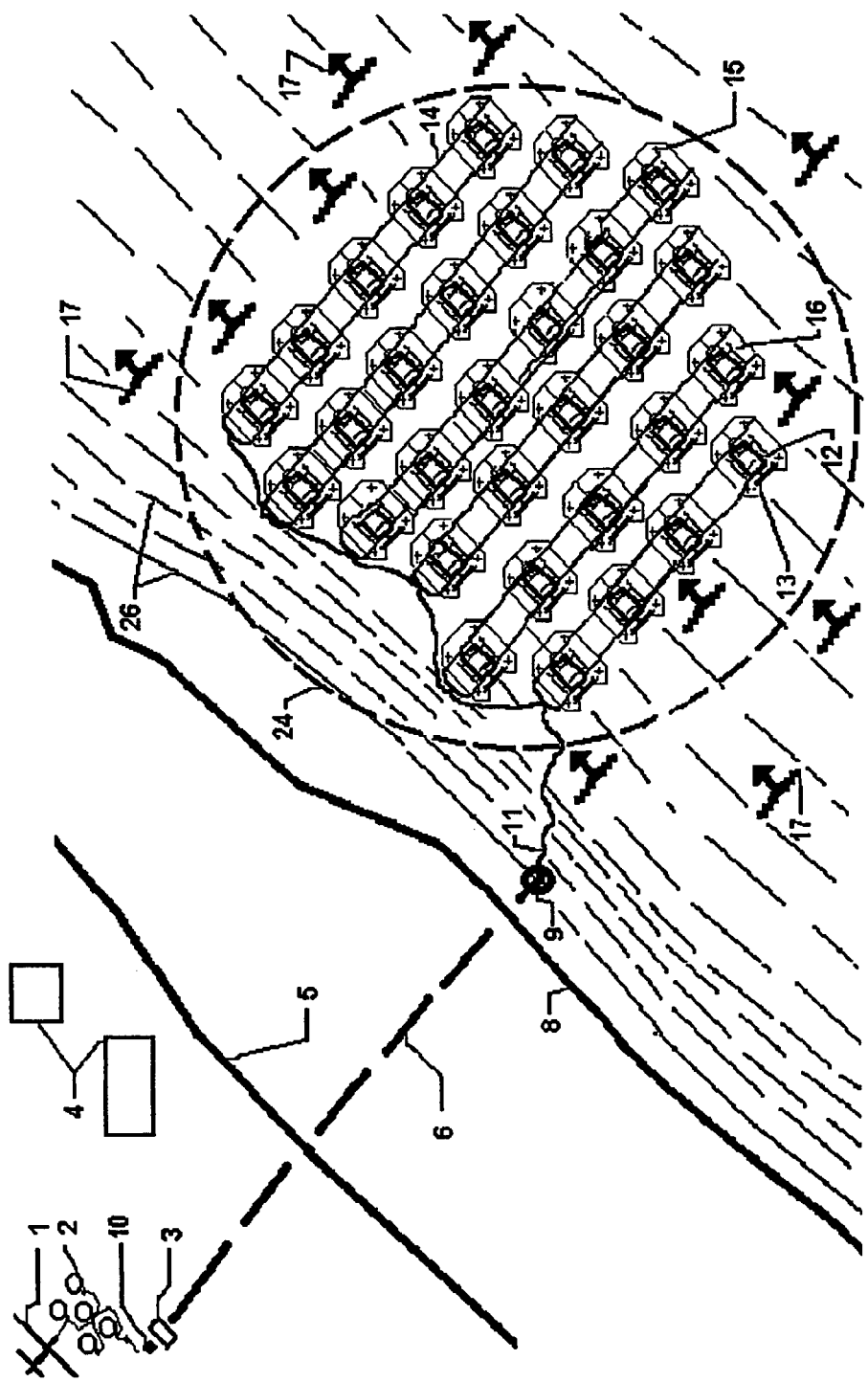
FIG. 3 is a plan view of a Hydro-Electric Farm in which the ocean current is in close proximity to the mainland shoreline.

FIG. 3: This is a plan view of a Hydro-Electric Farm 24 in which the ocean current 17 is in close proximity to the mainland shoreline 5. It shows the placement of the electric generators 12, the control wiring 14, the turbine blade/propellers 13, the concrete cradles 16, the pile anchoring system 15, the ocean current 17, the sloping ocean bottom is depicted as a line 8, and the ocean current's channel is depicted as the rapidly changing topographical lines 26. Notice how in this configuration the rows of electrical generators 12 are staggered so each individual generator and the turbine blade/propeller 13 are placed in a clean flow of ocean current water. This staggered configuration also accommodates the flowing water's natural phenomenon of a water current closing back in on itself a short distance after encountering an obstruction and then resuming its natural flow path again with minimal loss of the current's forward momentum. This resumption point is where another generator 12 and turbine blade/propeller 13 are placed to again harvest the energy of the flowing ocean current. This resumption flow point, for the next row of generators 12, placement spot is behind the first two staggered rows and maybe in line with the first row's generator, but placed some distance to the rear. The placement of the electric generators on this closing and resumption of the current's path and energy dictates individual generator placement throughout the entire field of generators on a typical Hydro Electric Farm 24. This plan also shows the relationship of the shore 5 with the sloping bottom of the ocean 8, the rapid topographical changes 26, after crossing the shoulder of the current's trench 8, and the placement of a Hydro-Electric Farm 24 on the slope of this trench, either on the sloping walls or on the floor, depending on optimal depth 18 from the surface 7 and most constant flow of the ocean current 17.

Figure 4:
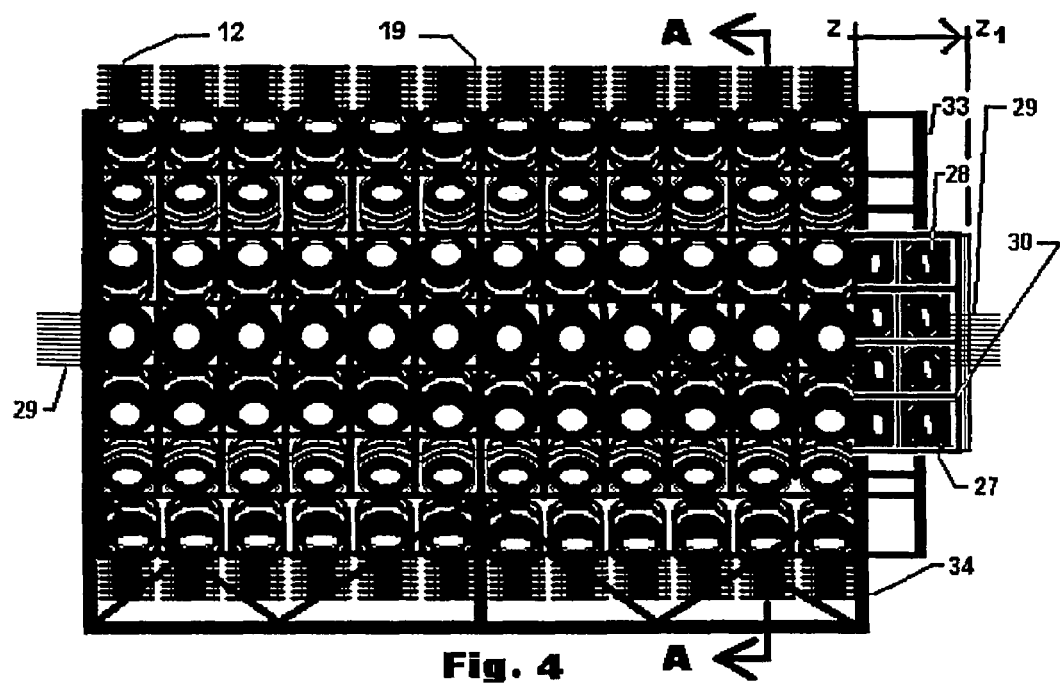
FIG. 4 is a side view of the internally supported electric generator assembly, including the turbine blade/propeller, in whichever style selected, being omitted, (see the omit line at the end of the turbine blade/propeller shaft), to focus on the electric generator and it's corresponding parts.

FIG. 4 is a side view of the internally supported electric generator assembly 12, including the turbine blade/propeller 13, in whichever style selected, has been omitted, (see the omit line at the end of the turbine blade/propeller shaft 29), to focus on the electric generator 12 and its corresponding parts. The internal field windings support rings 33, rotator electromagnet assembly 27, and the turbine blade/propeller shaft 29, have been pulled forward along the $Z$–$Z_1$ line in order to clearly show the internal components listed above. The rest of the electric generator 12 has the standard parts as already described, starting with the protective coating (schematically depicted as solid black surfaces) 19, the rotator electromagnet assembly 27, the turbine blade/propeller shaft 29, the rotator electromagnet supports on the shaft 30, the electromagnets 35, the stator field windings 32, the stator field windings support rings 33 and the generator cradle docking support struts 34.

Figure 5:
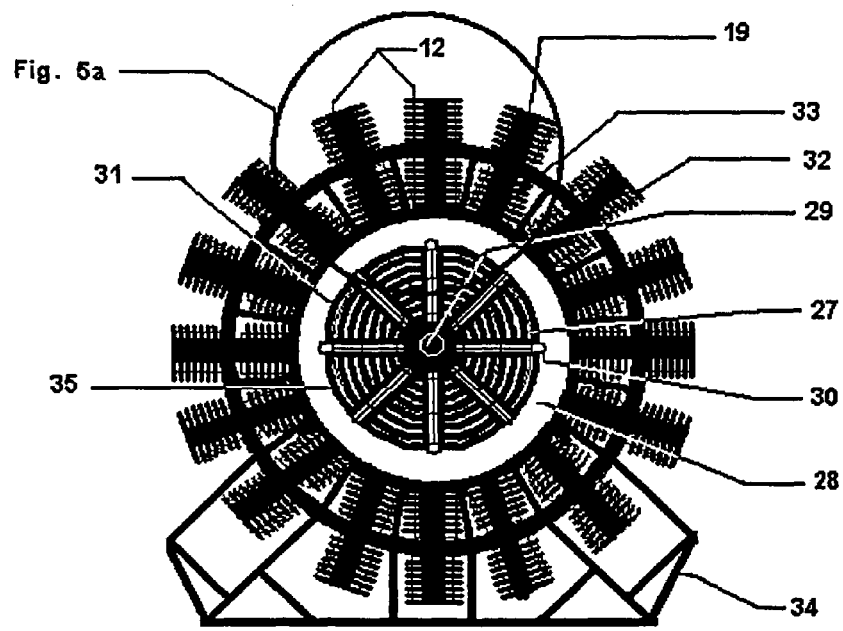
FIG. 5 shows a cross-sectional view of the internally supported electric generator, as shown in FIG. 4.

FIG. 5 shows a cross section along Cut line (A—A) of the internally supported electric generator 12, as shown in FIG. 4. The rotator electromagnet portion 27 of this electric generator is exposed to the water currents via the open passages 28 and the same non-conductive, heat dissipating, anti-fouling, water specific, protective coating 19 also protects its exposed surfaces. The protective coating 19 is comprised of multiple layers in order to achieve multiple design goals. The primary layer is designed to provide non-conductivity of large electrical voltages. The secondary layers bind the non-conductivity layers to anti-fouling, water specific, protective layers. Such protective coatings are known in the art and are typical of those marine coatings used in the shipbuilding industries, military ships and barges, etc. These anti-fouling protective layers provide the protection required specific to each site's location. The composite layers are thermally conductive in order to cool the generator as described above. The protective coating is applied to the generators and other required components by a combination of application methods; Dipping, spraying, brushing, powder coating, or in a combination of these methods. The coating composition is designed for the specific salt concentration, the organic and inorganic make up of local elements present and site specific temperature of the water, as well as many other environmental factors for each Hydro-Electric Farm location. The rotator electromagnet assembly 27 is made up of the rotator electromagnet's support and anchoring structures 30, the rotator electromagnets 35, and the rotating turbine blade/propeller shaft 29. The other components shown in this cross section are the field windings (stator) 32, the field windings support rings 33, the entire electric generator assembly 12, and the electric generator cradle docking support struts 34.

Figure 5A:
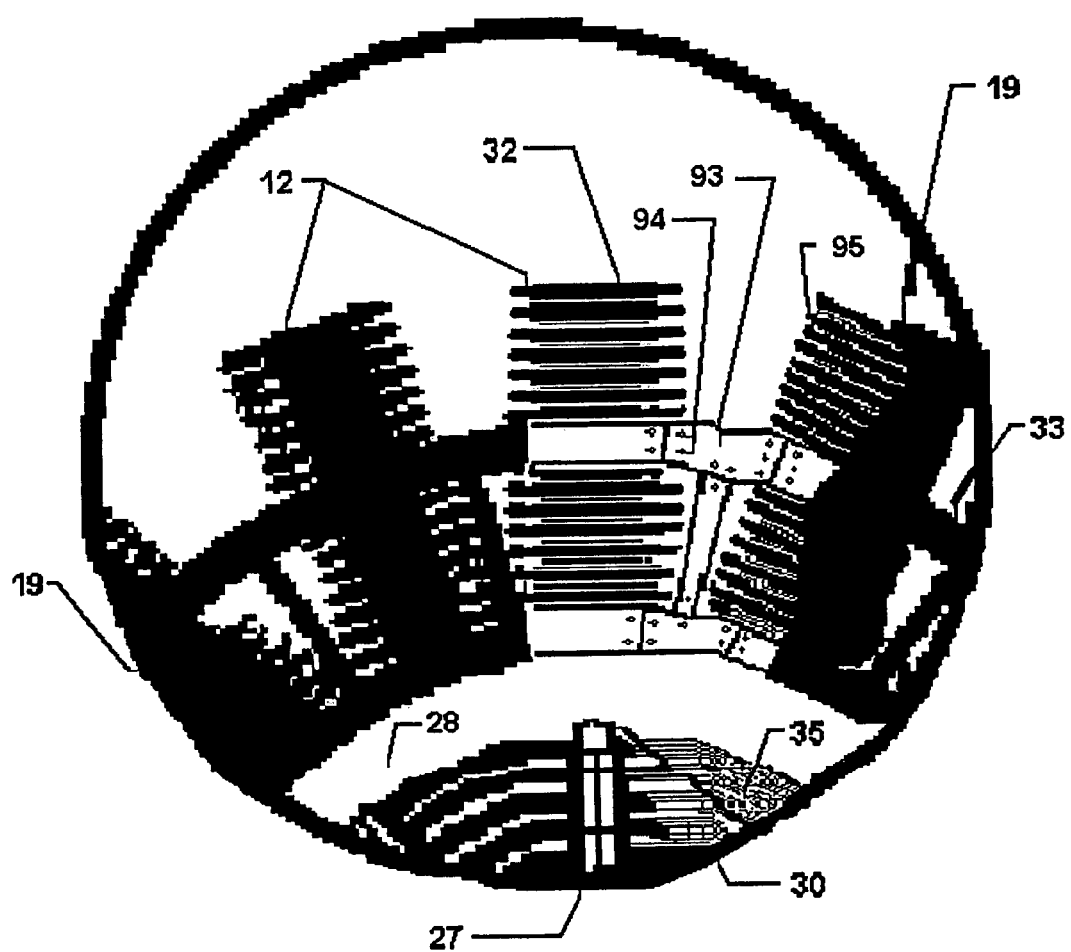
FIG. 5a is an exploded or expanded view of the top portion of the internally supported electric generator, as shown in FIG. 5 as the area to be highlighted in the expansion circle.

FIG. 5*a* is the expanded view of the top portion of the internally supported electric generator 12, cross cut (A—A), as shown in FIG. 5 as the area to be highlighted in the expansion circle. This expanded view shows the protective coating 19 removed from the field windings (stator) 32, the field windings support rings 33, the support ring connectors 93, the bolts 94 that hold the support ring and connectors together, the stator winding cores 95 and the rotator's electromagnets 35. The overall electric generator assembly 12 is partially shown in this circular expanded view, both the coated portion and the uncoated portion.

Figure 5B:
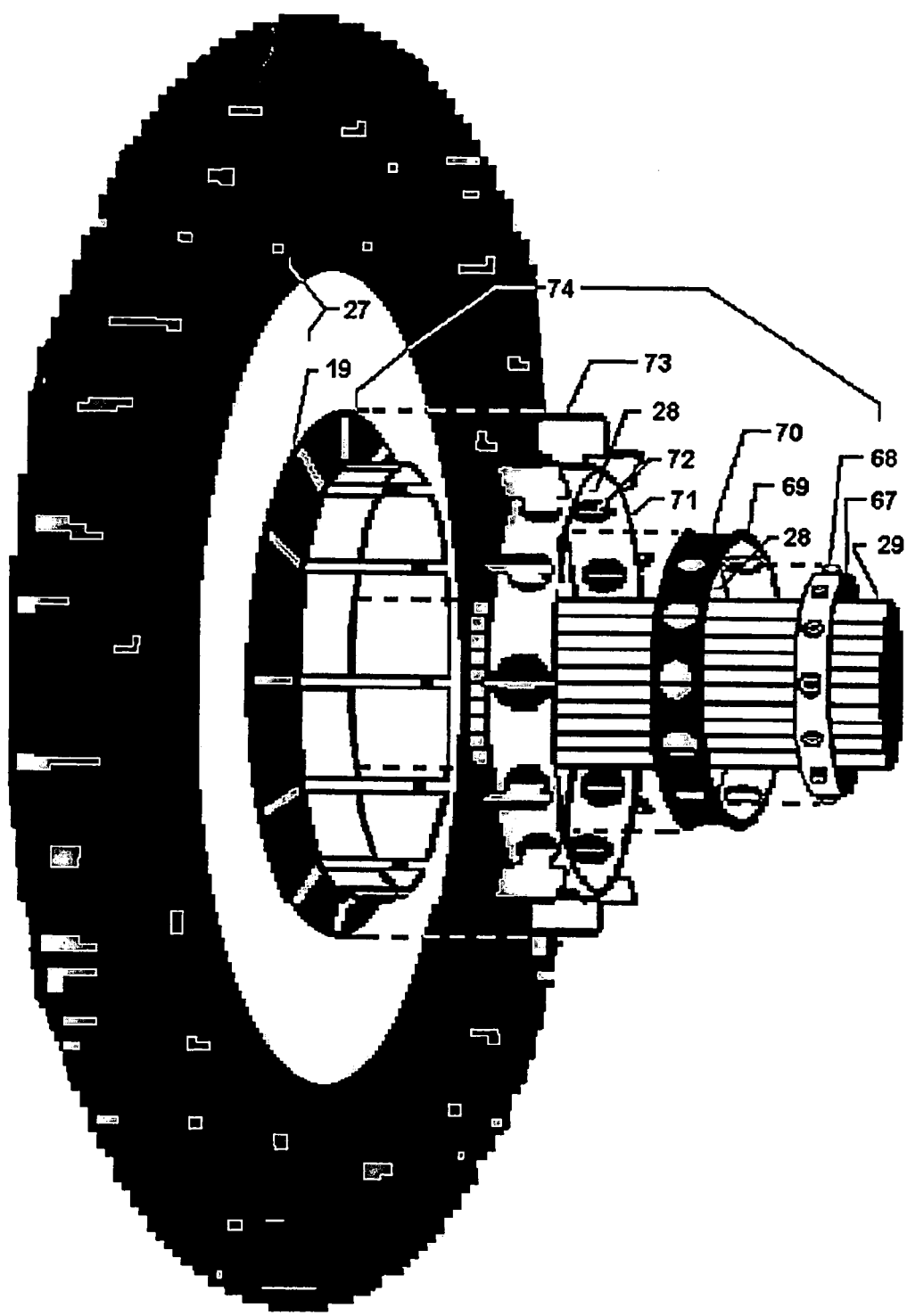
FIG. 5b is an exploded or expanded view of the Brush-Less Rotator Assembly as if it were pulled forward from the front of the standard rotator.

FIG. 5*b* is an expanded view of the Brush-Less Rotator Assembly 74 as if it were pulled forward from the front of the standard rotator 27. The main components of this brushless assembly are the transmitting ring 67, with its transmit nodes 68, the protective spacer ring 69, with its correctly placed spaces (apertures) 70, and the reception ring 71, with the reception nodes 72, connected to the reception tabs 73 that are embedded into the windings of the electromagnets 35 that have been previously discussed in the internally supported electric generator 12. This brush-less assembly and its components are also coated with the protective coating 19, where required. Obviously, the transmit nodes 68 and the reception nodes 72 are not coated and are constructed from naturally occurring non-corrosive materials that can continue to transmit the electrical charge to power the rotator's 27 electromagnets 35. The reception tabs 73 are locked into the corresponding internal wired grid of the electromagnets 35, as in a conventional rotator 27, this has not been shown, as it is standard in the industry. The electrical energy that the transmitter nodes 68 fire to the reception nodes 72 is supplied via internally wired circuits in this particular portion of the turbine blade/propeller shaft 29. These electrical charges required for the electromagnets 35 to maintain their polarity are fired the short distance between the transmitting nodes 68 and the reception nodes 72 through the protective spacer ring 69 letting the ocean water provide the electrical connection between. These nodes and their corresponding attachment rings and the spacer ring 69 provide the shortest point between the transmitting nodes 68 and the reception nodes 72 in this defined space, and yet are part of the water environment. Again, the ultimate goal is to design as many non-contact mechanical elements into the Hydro-Electric Farm as possible.

Figure 6:
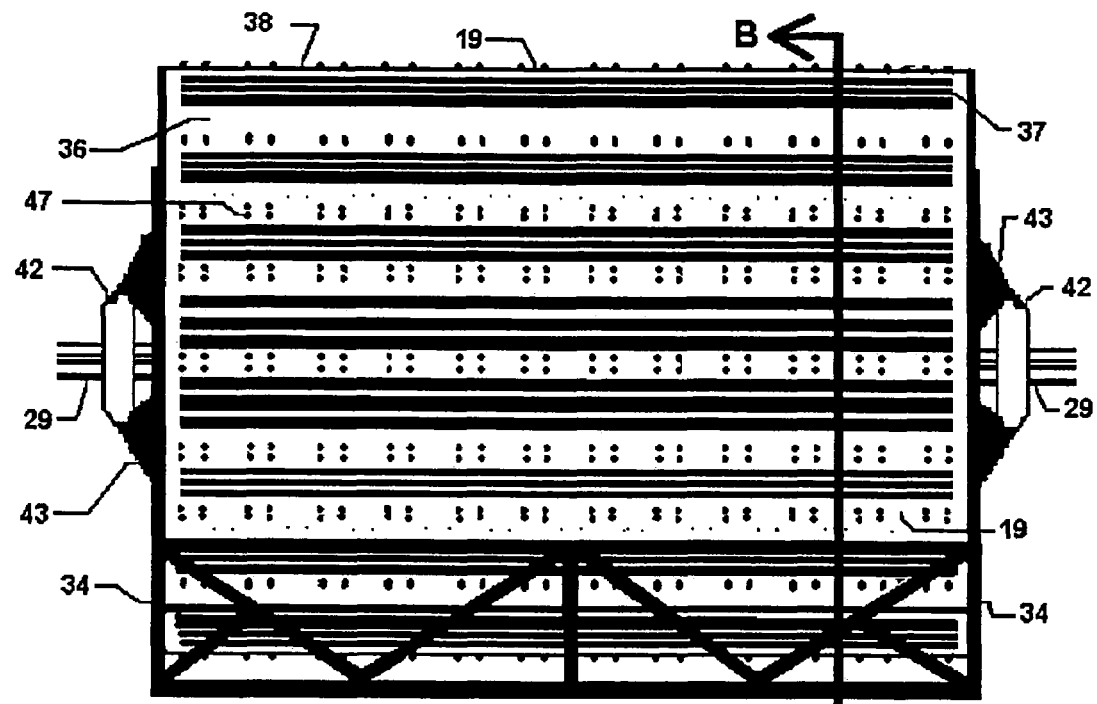
FIG. 6 is the side view of an externally supported (stator) field wound electric generator, the turbine blade/propeller being omitted (see the omit line at the end of the turbine blade/propeller shaft), to focus on the electric generator and its corresponding parts.

FIG. 6 is the side view of an externally supported (stator) field wound electric generator 38, the turbine blade/propeller has been omitted (see the omit line at the end of the turbine blade/propeller shaft 29), to focus on the electric generator 38 and its corresponding parts. The external shell (clamshell type arrangement) 36 supports the field winding much as in a conventional air-cooled electric generator. In this immersion electric generator configuration the shell and internal parts are protected by the non-conductive, heat dissipating, anti-fouling, water specific, protective coating, 19. The ocean water is encouraged to flow around the field windings 32, the electromagnetic rotator assembly 27, the shaft 29 and supports 30, and in and out of the external support shell 36 through openings in the external shell 37, and through the front and rear of the shell. The field windings and electromagnets naturally have spaces between their individual components that also allow the water access around them inside the shell 36. The field windings and cores are attached to the exterior shell with non-corrosive rods and bolts 47. The internal parts have not been pulled out of the shell in this drawing, as they are similar to the parts already shown in FIG. 4 except for not having the internal field winding support rings 33. The externally supported electric generator 38 are interchangeable with the internally supported generator 12. In many of the drawings we have depicted the electric producing generators as type 12 for simplicity. The same principles also apply for the externally supported electric generators 38.

Figure 7:
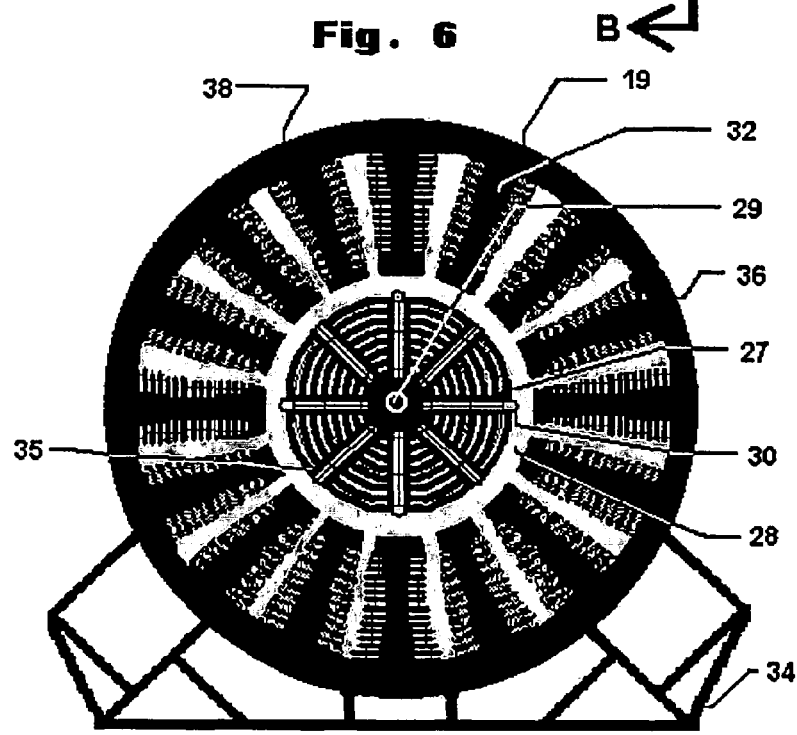
FIG. 7 is a cross-sectional view along cut line (B—B) of FIG. 6 of the externally supported electric generator.

FIG. 7 is a cross section view along cut line (B—B) of FIG. 6 of the externally supported electric generator 38. The internal parts are visible and are similar to the internally supported electric generator 12, except the absence of the field winding support rings 33, this support is again completed by the external shell arrangement 36. The other standard electrical generator parts of the internally supported electric generator 12, as shown in FIG. 5 are present in this design. The turbine blade/propeller shaft 29 is in the center, with the electro-magnets 35 attached to it by means of the shaft magnet supports 30. Water passages 28 are between the field windings 32 and the rotator assembly 27. The external shell 36 supports the field windings 32. Water passages 28 are in between the field windings 32, the exterior shell 36 and the outside ocean current 17. Again, this design increases production of electrical power by keeping the winding's insulation cooler than an air environment electric generator. The same coating 19 protects the externally supported electric generator 38 exposed surfaces to the ocean water, as mentioned previously. The externally supported electric generator 38 also employs the cradle docking support struts 34. This feature is also crucial to the modular replacement of the generating units 38 and 13, as a replaceable unit, similar as replacing 12 and 13, as previously described.

Figure 8:
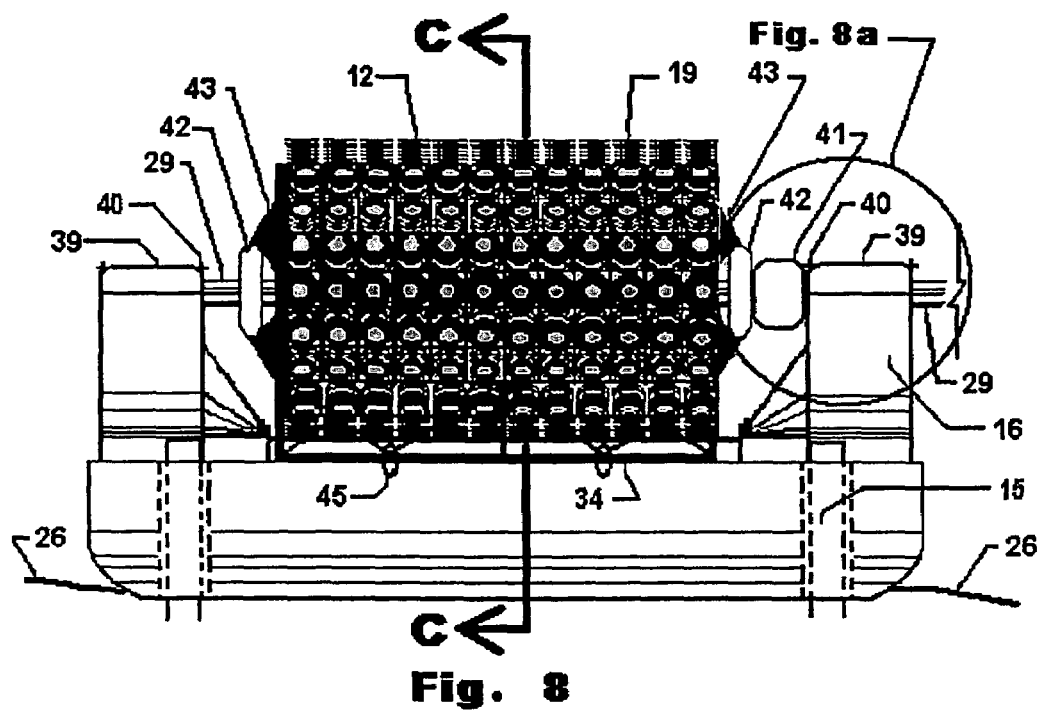
FIG. 8 is side view of the internally supported electric generator as it sits on the pre-manufactured cradle, again with the turbine blade/propeller being omitted to focus on the electric generator and the corresponding cradle.

FIG. 8 is a side view of the internally supported electric generator 12 as it sits on the pre-manufactured cradle 16, again the turbine blade/propeller has been omitted to focus on the electric generator 12 and the corresponding cradle 16. This view shows the concrete cradle 16, the cradle docking support struts 34, the cradle docking pins 45, the cradle anchoring piles 15, the turbine blade/propeller shaft 29, the cradle rotational shaft mounting module 39, the mounting module's release mechanism 40, the shaft rotational gear up unit 41, the electric generator's rotational shaft stabilizer 42, the electric generator's internal frame connection 43 to the rotational shaft stabilizer 42, the electric generator 12, the protective coating 19, and the placement on the ocean bottom as depicted by 26. The cradle rotational shaft mounting module 39, the shaft rotational gear up unit 41 and the electric generator's rotational shaft stabilizer 42 in the conventional arrangement are in contact with the turbine blade/propeller shaft 29. Conventionally these rotational support-bearing points would necessitate the use of hardened bearings and races. These components may be the only items that necessitate special protection from the ocean water.

Figure 8A:
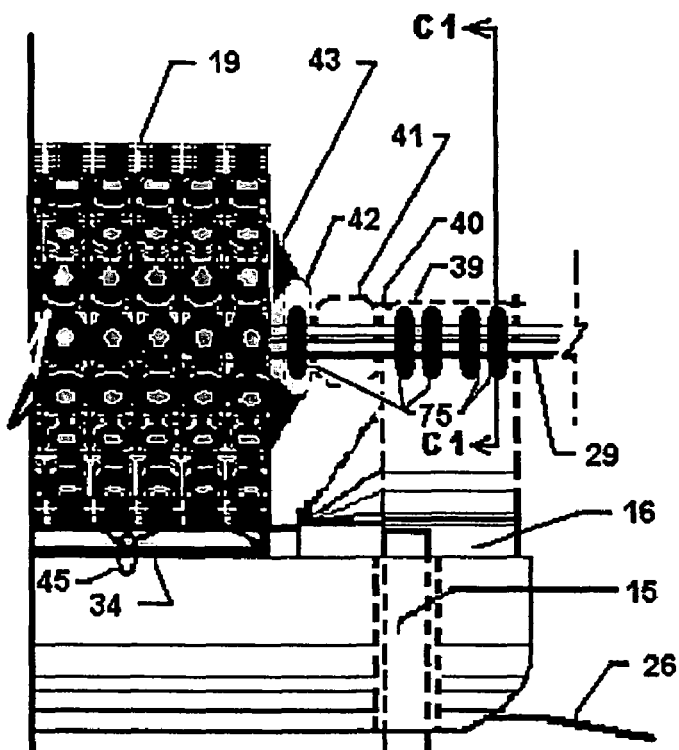
FIG. 8a is side view of a concrete cradle mounted with an internally supported electric generator.

FIG. 8a is a side view of a concrete cradle 16 mounted with an internally supported electric generator 12. The outer covers of the rotational shaft mounting module 39 and the electric generator rotational shaft stabilizer 42 have been striped away to show the magnetic force support points 75. These magnetic force support points 75 are mounted in multiple units along the turbine blade/propeller shaft 29 as required to support the multiple types of turbine blades 13, shaft 29, gear up unit 41, brush-less rotator assembly 74 and the rotator assembly 27.

Figure 8B:
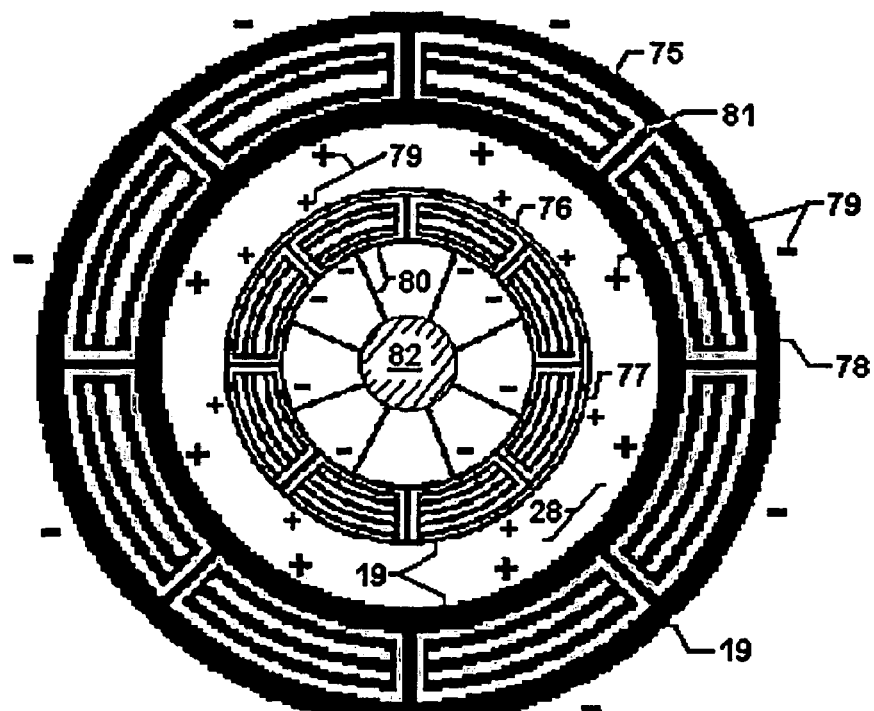
FIG. 8b is a cross-sectional along cut line (C1—C1) showing the internal components of the Magnetic Force Support Points.

FIG. 8b is a cross section along cut line (C1—C1) showing the internal components of the Magnetic Force Support Points 75. The corresponding components are as follows: First there is the outer ring electromagnets 78, the outer electromagnetic induced polarity 79, the outer ring magnet control and power wiring 81, the protective coatings 19, the water passage between the inner and outer magnetic rings 28, the inner electromagnetic ring 76, the inner ring control wiring 80, the inner ring induced polarity 79, the turbine blade/propeller shaft coupler 82. This is based on the simple principle that like kind polarity magnetic fields repel other like kind polarity magnetic fields. The shaft stabilizer units 42 and the rotational shaft-mounting module 39 capture the outer ring's electromagnets 78 and hold them in place. The inner electromagnetic ring 76 is attached to, via the coupler 82, and become a part of the rotational mass, including the shaft 29. The electric force is calibrated for rotational pull, mechanical pull and the overall weight to be supported at depth in order to permanently suspend the rotational shaft 29 within the center of the outer electromagnetic ring 78. Wiring to these electromagnets is accomplished by the use of the brush-less FIG. 5b, concepts already discussed above.

Some other design alternates of these metal to metal contact points are as follows: One solution to protect these support and turning shaft points from the ocean water environment would be to enclose conventional rotational bearing races in a sealed container filled with an inert gas under pressure, thus resisting water intrusion into the races. And of course, a more common solution is to support the turbine blade/propeller shaft 29, in a more conventional nature in which the rotational bearings and races that are required are constructed from very dense non-corroding composite materials or metals. These materials maybe of alloyed metals, ceramics and/or other substances selected for their design qualities in this particular use.

Figure 9:
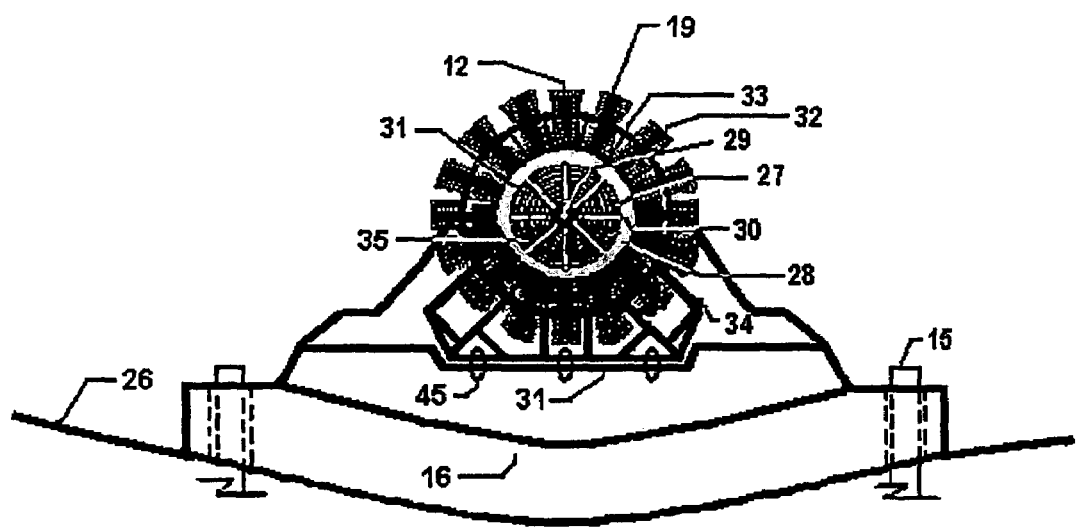
FIG. 9 is a cross-sectional along cut Line (C—C) of FIG. 8 of the internally supported electric generator on the pre-manufactured concrete cradle.

FIG. 9 is a cross section along cut Line (C—C) of FIG. 8 of the internally supported electric generator 12 on the pre-manufactured concrete cradle 16. It shows the cradle docking support struts 34 mated with the corresponding recess 31 secured by the docking pins 45 in the pre-manufactured concrete cradle 16. The other components have already been discussed in length above.

Figure 10:
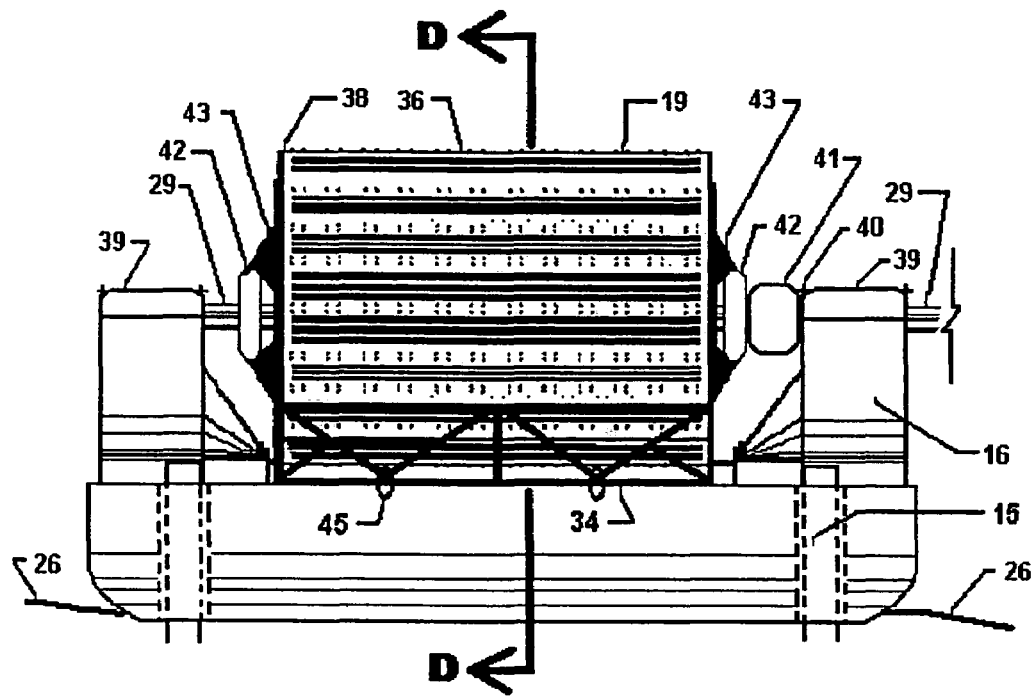
FIG. 10 is a side view of an externally supported electrical generator on the pre-manufactured concrete cradle.

FIG. 10 is a side view of an externally supported electrical generator 38 on the pre-manufactured concrete cradle 16. This drawing also depicts the standard parts that are listed above and shows the interchangeability of the internal electric generator 12 and the externally supported generator 38.

Figure 11:
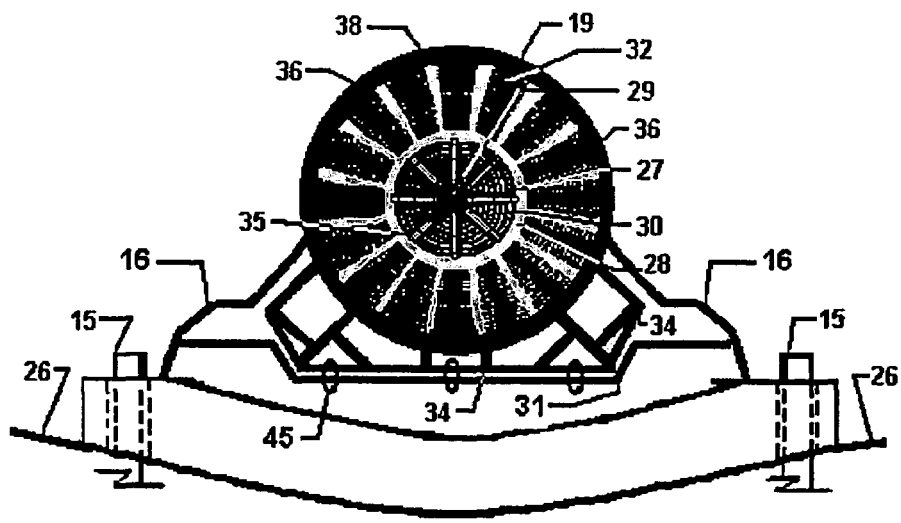
FIG. 11 is a cross section along cut Line (D—D) of FIG. 10.

FIG. 11 is a cross section along cut Line (D—D) of FIG. 10. The commonality of the parts has been previously discussed. This again shows the interchangeability of the electric generators 12 and 38.

Figure 12:
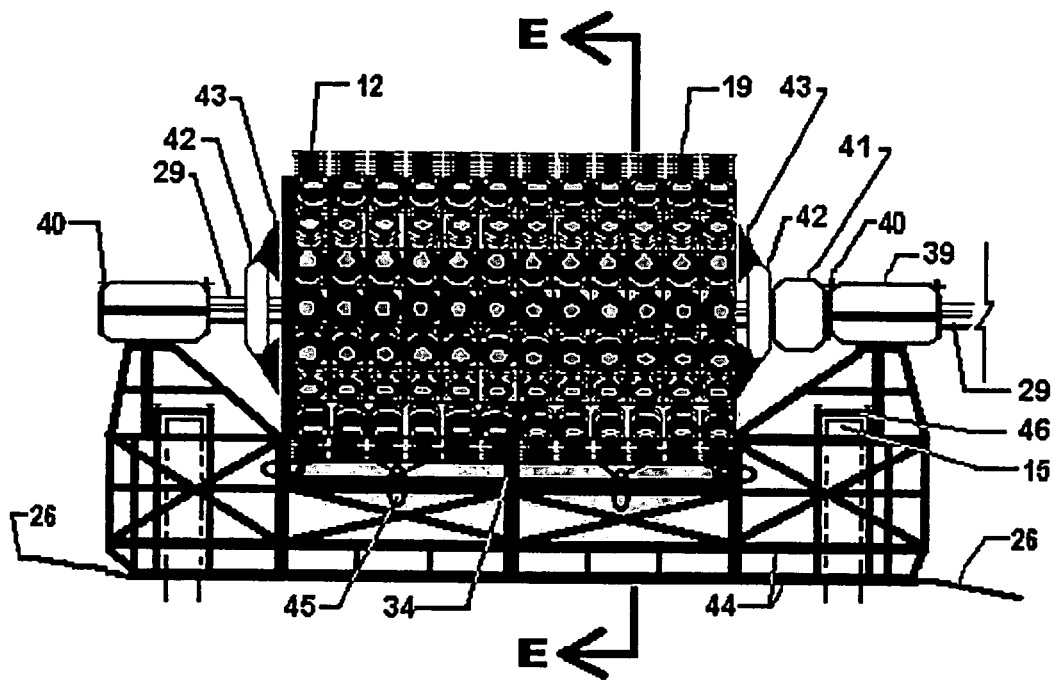
FIG. 12 shows the internally supported generator attached to a different type cradle system, again with the turbine blade/propeller being omitted to focus on the electric generator and the corresponding cradle.

FIG. 12 shows the internally supported generator 12 attached to a different type cradle system 44, again the turbine blade/propeller has been omitted to focus on the electric generator 12 and the corresponding cradle 44. These open web cradles 44 are constructed of structural members of either non-corrosive composites or metals or be coated with the protective coating 19. The docking pins 45 are the connection between the cradle's docking support struts 34 and the open web cradle 44. In this open web cradle 44 design, the anchoring piles 15 are mated to the frame of the cradle with an adjustable pile restraint cap 46. They are closed after the piles have been placed into the ocean bottom. This allows the open web cradle 44 to resist the ocean current 17. The other parts of the open web cradle 44 and electrical generator 12 are the same as shown and discussed above in FIG. 8 and before. The open web structural members allow more ocean current 17 to pass thru the cradle than the concrete cradle design 16, as has already been discussed.

Figure 13:
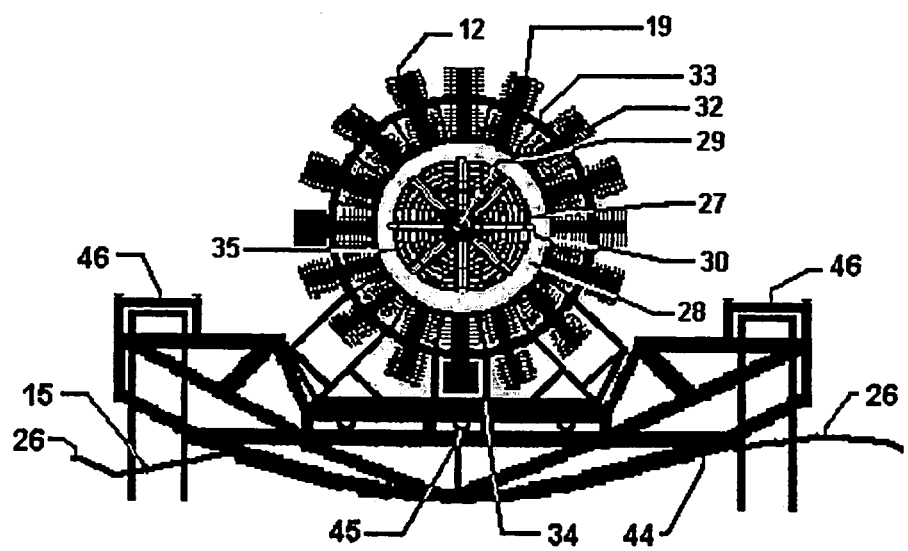
FIG. 13 is a cross-sectional view along cut line (E—E) of FIG. 12 of the internal supported electric generator mated with the open web cradle.

FIG. 13 is a crosscut view along cut line (E—E) of FIG. 12 of the internal supported electric generator 12 mated with the open web cradle 44. Note the cradle docking support struts 34 and the docking pins 45. The anchoring piles 15 are also captured with the pile restraint caps 46. The other components shown are also the same as already discussed above.

FIG. 13a is a front view of the internal supported electric generator 12 arrayed in unison side by side on an elongated open web cradle 44a. The common components have already been discussed above. This arrangement allows the elongated open web cradle to act as a suspension bridge and support these multiple electric generators 12 across a longer reach of sloping topographical bottom 26. The length of the extended open web cradle 44a has been truncated by the cross cut line (G—G). These open web cradles are sized for length and number of supported electrical generators 12 for each individual farm's unique design criteria.

FIG. 13b is a plan view of the open web cradle 44a showing the elongation and placement of multiple electric generators 12. The length of the extended open web cradle 44a has been truncated by the cross cut line (H—H). Again, the common elements have been discussed above. The extended open web cradles, in some instances are connected with other extended open web cradles, side-to-side and front-to-back, based on each individual farm's criteria. The design of number of electric generators 12 placed at each farm is unique to each individual Hydro-Electrical Farm site.

Figure 14:
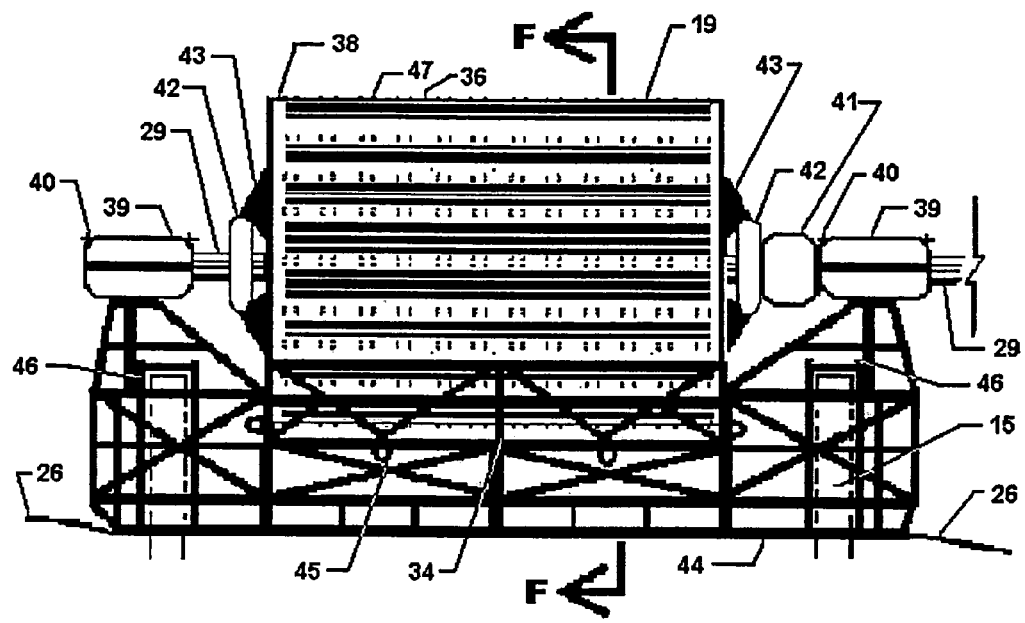
FIG. 14 is a side view of an externally supported electric generator placed on an open web cradle, again with the turbine blade/propeller being omitted to focus on the electric generator and the corresponding cradle.

FIG. 14 is a side view of an externally supported electric generator 38 placed on an open web cradle 44, again the turbine blade/propeller has been omitted to focus on the electric generator 38 and the corresponding cradle 44. The components are the same as previously discussed including: the rotational shaft 29, the shaft mounting module 39, the mounting module release mechanism 40, the shaft rotational gear up unit 41, the electrical generator mounted shaft stabilizer 42, the cradle docking support struts 34, the docking pins 45, the adjustable pile restraint cap 46, and the externally supported shaft stabilizer mounts 47. It should also be noted here that the open web cradle 44 design would also lend itself to multiple electric generator 38 placements on a single open web elongated cradle 44a. The elongated open web cradle 44a then acts as a suspension bridge to support these multiple electric generators 38 across a longer reach of sloping topographical bottom 26. This again, depicts the interchangeability of the electric generators 12 and 38.

Figure 15:
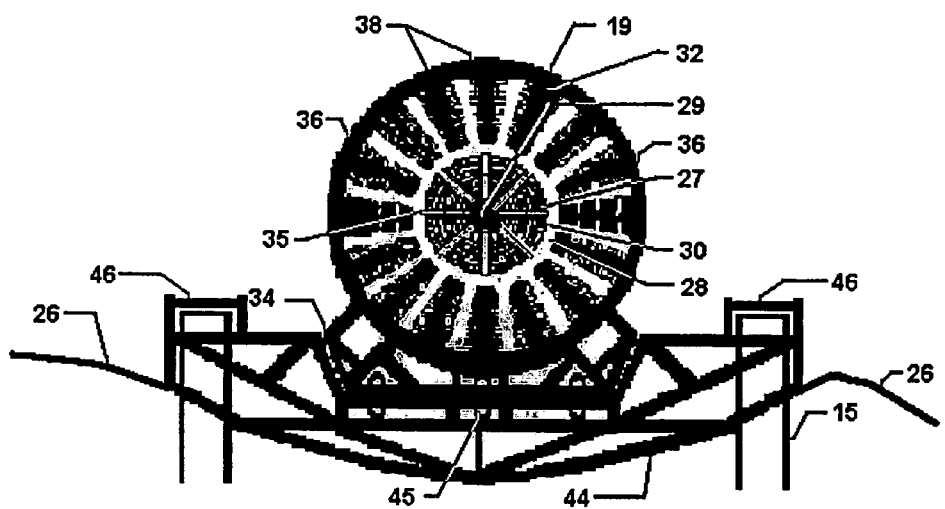
FIG. 15 shows a cross section of an externally supported electric generator placed on an open web cradle along cut line (F—F) of FIG. 14.

FIG. 15 shows a cross section of an externally supported electric generator 38 placed on an open web cradle 44 along cut line (F—F) of FIG. 14. The parts as labeled have already been discussed in detail above. To recap, the main parts are the externally supported electric generator 38, the open web cradle 44, the pile anchors 15, the cradle docking support struts 34, the docking pins 45, the pile restraint caps 46 and the sloping topographical changes 26.

Figure 16:
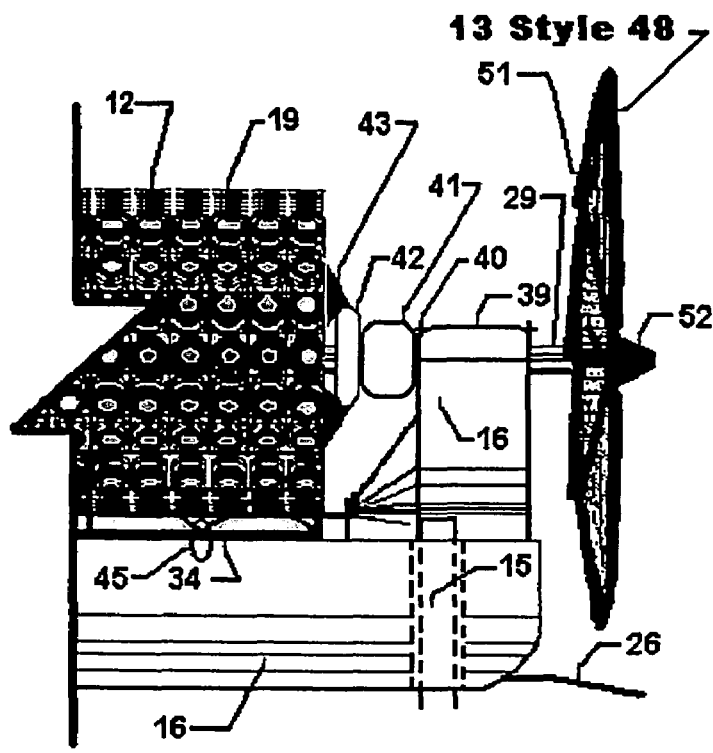
FIG. 16 shows the placement of a Turbine Blade Propeller style on the blade spindle, connected to the end of the turbine blade/propeller shaft, which powers an internally supported electric generator.
Figure 17:
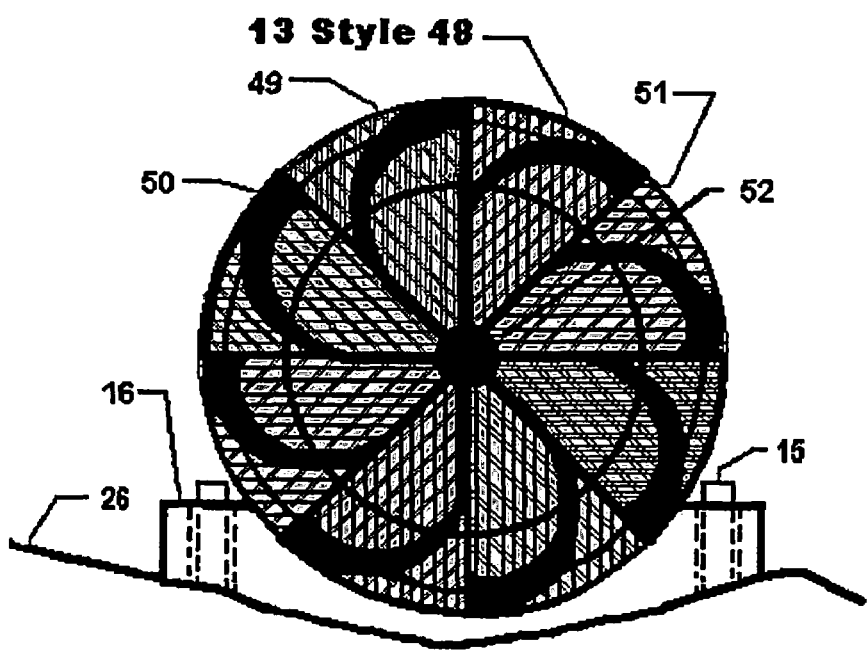
FIG. 17 is the front view of the Turbine Blade Propeller style noted in FIG. 16 and which has in a rotational configuration eight individual blades pitched and overlapped in order to maximize conversion to rotational movement.

FIGS. 16 and 17 shows the placement of the Turbine Blade Propeller 13 style 48 on the blade spindle 52, connected to the end of the turbine blade/propeller shaft 29, which powers an internally supported electric generator 12. This arrangement could also be made with the externally supported electrical generator 38. As the turbine blade/propeller shaft 29 can be utilized with both types of generators so can various types of water current driven rotational units be able to be placed on either of these generators by use of the turbine blade/propeller shaft 29. The Turbine Blade Propeller 13 style 48 is perceived as an open weave bladed windmill type arrangement with surface added directional enhancers. The weave itself is unique and is comprised of structural non-corroding channels 49 that direct the water flow in an altered direction as it passes through and over the face of each channel 49. This action gives the blades increased rotational force. The amount of open space between the individual channels is a consideration of: size of blades, rotational force required, structural stability, multiplicity and other engineering principles. To the front of this blade channel weave can be added further directional enhancers 50. These enhancers add to the rotational output. Finally, each individual blade is positioned in relationship with it's neighboring blade much as the conventional windmill blades, both in blade pitch into the flowing current and individual blade shape overlap so that each component blade 51, comprised of the channel weave 49 and the rotational enhancers 50, also act as a homogenized single blade on a rotator to further add to the rotational force placed on the turbine blade/propeller. These blades 51 are large and slow moving, but exert large amounts of rotational torque on the turbine blade/propeller shaft 29.

FIG. 17 is the front view of the Turbine Blade Propeller 13 style 48 and has in a rotational configuration eight individual blades 51 pitched and overlapped in order to maximize conversion to rotational movement. The blade composition has been discussed earlier, and is made up of a weave of non-corrosive channels 49 overlaid with rotational enhancers 50 set on the center-mounted spindle 52 that is mated to the turbine blade/propeller shaft 29. The pre-manufactured concrete cradle 16 and anchoring piles 15 are shown as a gauge to relative size, the open web cradle 44 could have been depicted because of design interchangeability. To simplify the drawings, the concrete cradle 16 will continue to be used as part of the illustrations for the different types of turbine blade/propeller type units. The electric generator unit, either 12 or 38, is hidden behind the turbine blade/propeller in this view. The exact size of the turbine blade/propeller may be larger or smaller than what is depicted, based on the engineering calculations required for optimum performance with the connected generators, either 12 or 38, required rotational torque demands.

Figure 18:
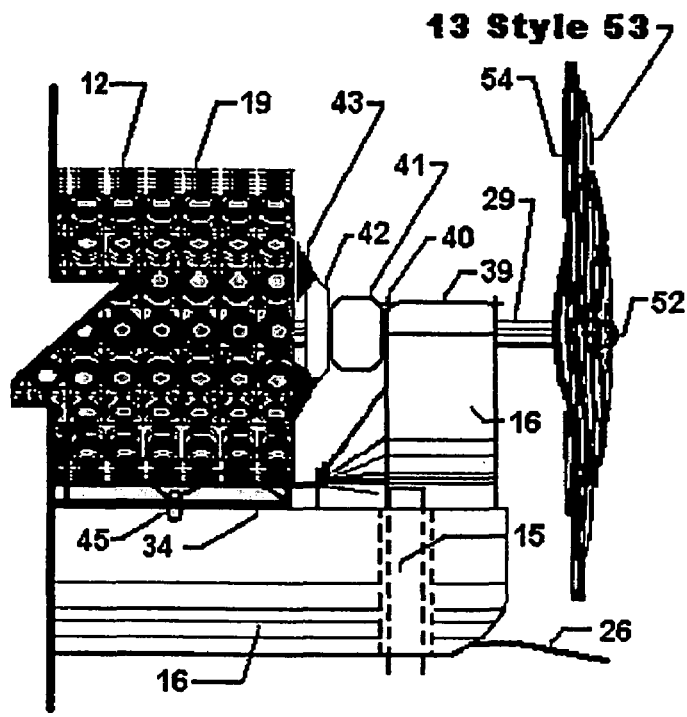
FIG. 18 shows the placement of a Propeller Weave Rotational Unit style, on an internally supported electrical generator.
Figure 19:
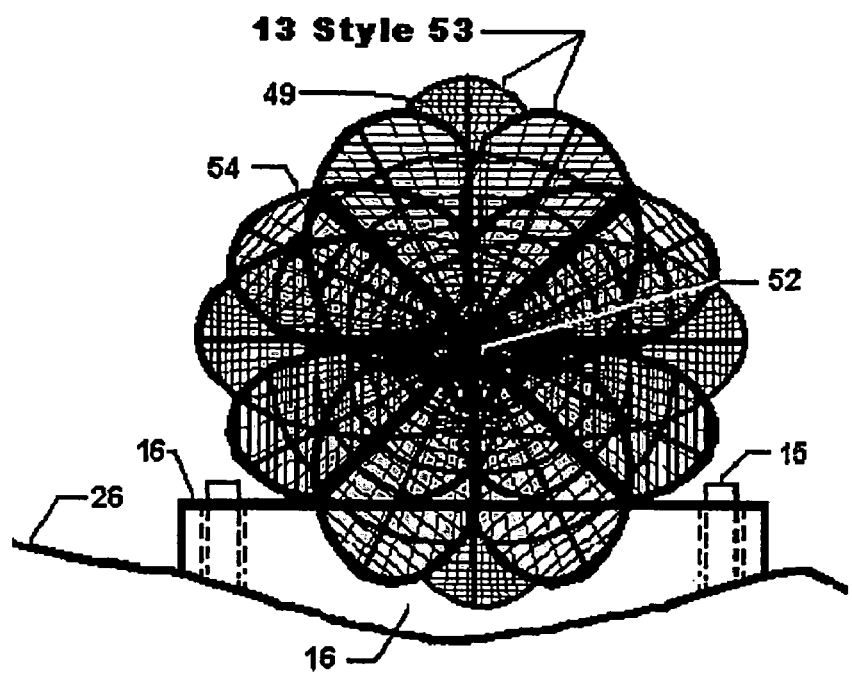
FIG. 19 is the front view of the Propeller Weave Rotational Unit style noted in FIG. 18.

FIGS. 18 and 19 shows the placement of the Propeller Weave Rotational Unit 13 style 53, on an internally supported electrical generator 12. This arrangement is again made up of an open weave arrangement of channels 49 grouped in a turbine blade fashion. This composite is constructed in the fashion of overlapping and pitched blades 54, while each blade captures a portion of the current's 17 kinetic energy, it also allows the remainder of the current 17 to pass through and affect the next blade 54 that is positioned offset and behind the blade in front. This multi-layering of blades 54 continues until the required rotational torque is applied to the center spindle 52, which transfers this energy to the rotational shaft 29, that then powers the attached electric generator, either 12 or 38.

FIG. 19 is the front view of the Propeller Weave Rotational Unit 13 style 53. It is visible that this unit is made up of three layers of four blades 54 that are constructed of the rotational weave channels 49 previously discussed. These blades 54 are formed in a square with radius corners shape. This shape provides the maximum rotational weave 49 surface area to the current 17. The rotational weave 49 also allows the current's force to act correspondingly on the multiple layers of blades 54, as previously discussed. This unique shape of the blade 54 also lends itself to be angled into the current and add to the rotational force exerted on the coupled shaft 29. The Propeller Weave Rotational Unit 13 style 53 has been depicted in FIG. 18 and FIG. 19, as three layers of four blades, but may be either more or less layers or blades, depending on the torque requirements of the electric generator to be powered.

Figure 20:
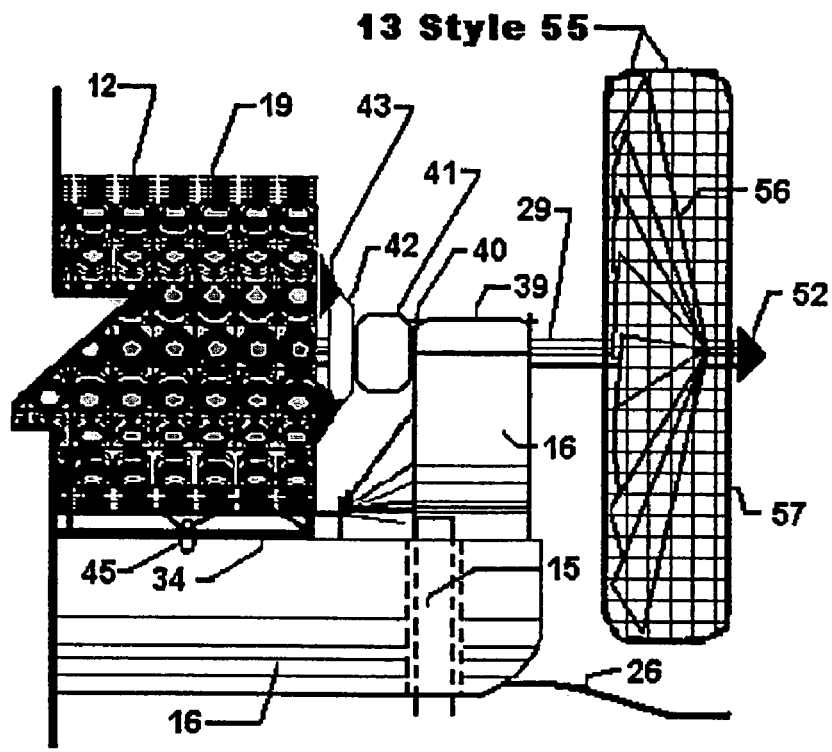
FIG. 20 is a side view of The Box Blade Weave Propeller style.

FIG. 20 is a side view of The Box Blade Weave Propeller 13 style 55. This is a more conventional propeller arrangement. The body of this style is made up of a weave of structural non-corroding channels 49 that again direct the water flow in a slightly altered direction as it passes through and over the face of the channels 49. This reaction to the force of the current imparts a rotational force to the weave as a whole. This weave again is arranged in a blade type fashion. The blades are connected via a center spindle 52 to the rotational shaft 29, which imparts rotational force to the attached electric generator, either 12 or 38. In this arrangement the blades 56, are protected by a circular cage arrangement 57 that also serves to direct the flow of the current 17 against the blades to increase the rotational force imparted on the system as a whole.

Figure 21:
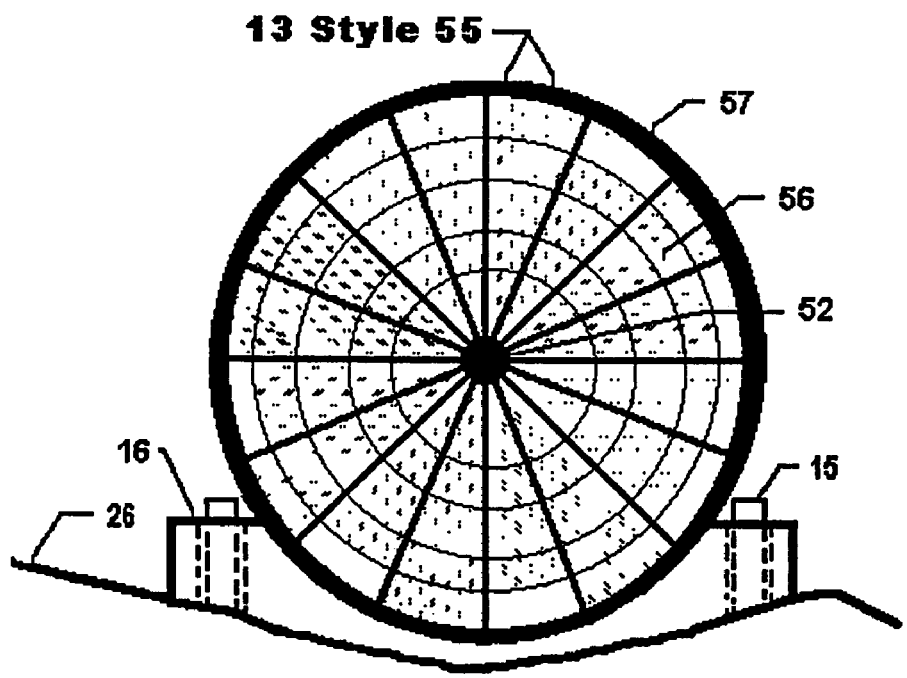
FIG. 21 is the front view of Box Blade Weave Propeller style of FIG. 20.

FIG. 21 is the front view of Box Blade Weave Propeller 13 style 55. The circular cage 57 also protects the blades 57 from floating objects carried in the current 17. The other items shown are as previously discussed: Pre-Manufactured concrete cradle 16, anchor piles 15, the blades 57, the blade weave composition 49, the spindle 52, and the ocean current channel bottom 26.

Figure 22:
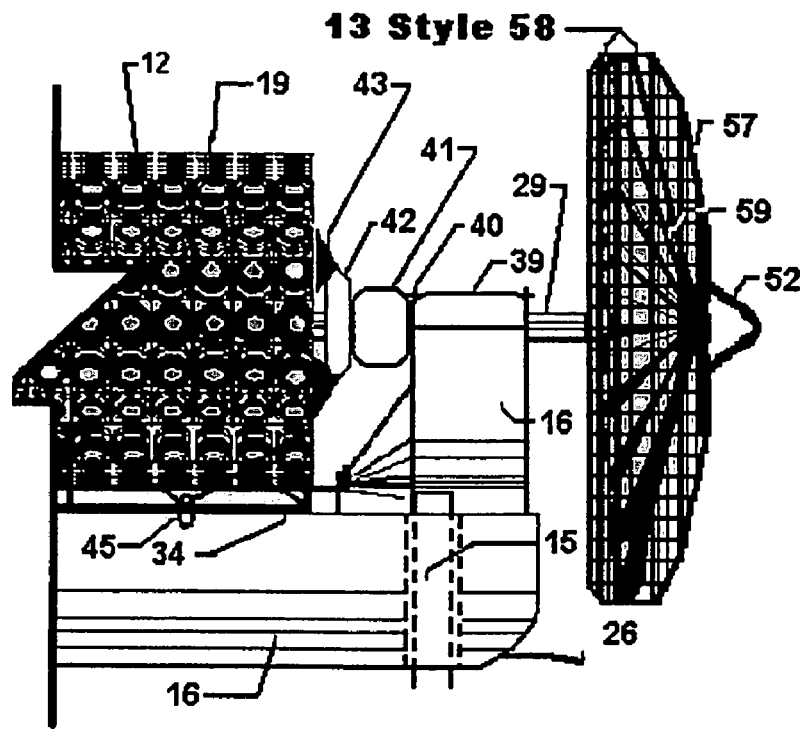
FIG. 22 is the side view of the Box Blade Solid Vane Propeller style.

FIG. 22 is the side view of the Box Blade Solid Vane Propeller 13 style 58. In this arrangement the blades 59 are constructed in a more conventional fashion using non-corroding material of a solid material. These blades are constructed in a fan type arrangement inside a similar circular cage 57, connected to a center spindle 52, and with the other corresponding parts as already discussed. This fan arrangement is drawn as having 16 blades, but may have more or less and be shaped differently based on the rotational torque required by the electric generator coupled to the shaft 29.

Figure 23:
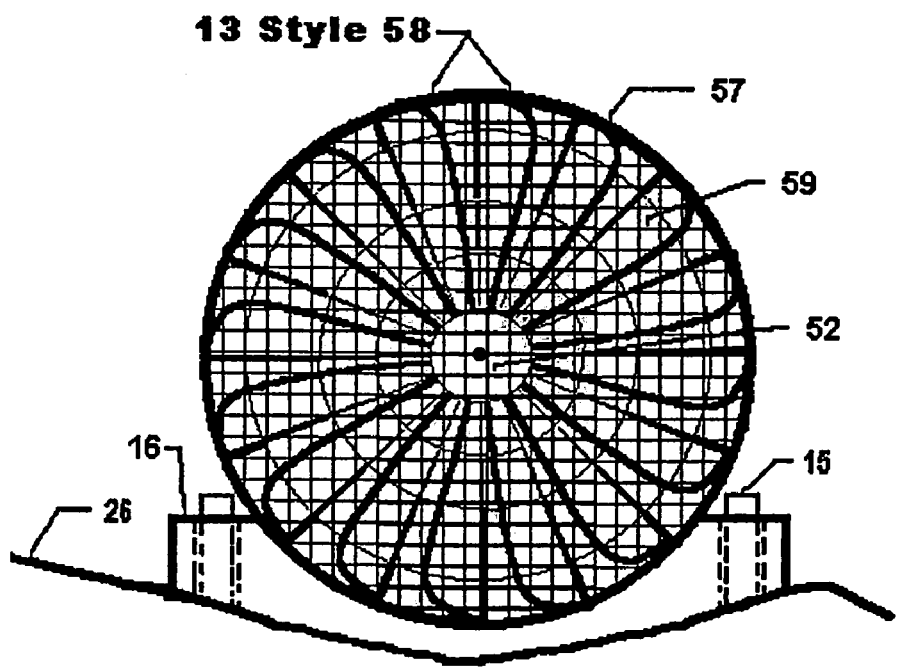
FIG. 23 is the front view of the Box Blade Solid Vane Propeller style of FIG. 22.

FIG. 23 is the front view of the Box Blade Solid Vane Propeller 13 style 58.

Figure 24:
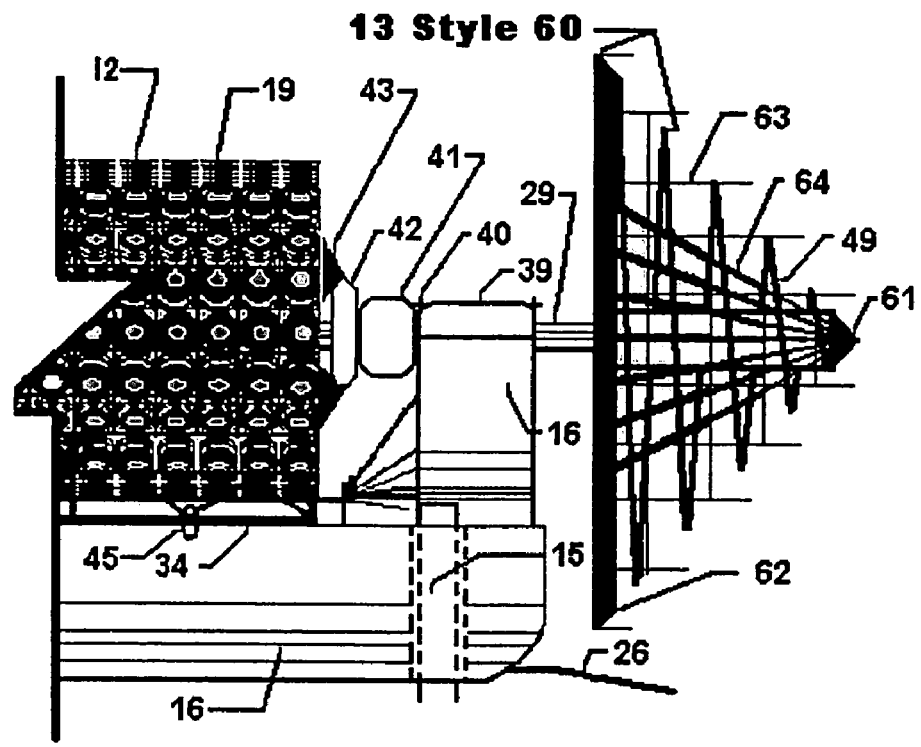
FIG. 24 is the side view of The Skeletal Spiral Turbine style.

FIG. 24 is the side view of The Skeletal Spiral Turbine 13 style 60. This rotational assembly is constructed in an increasing spiral form from the center point 61 toward the outside edges 62. This spiral is angled to optimally direct the current toward the outer edges of the spiral thus turning this directed force of the ocean water current 17 into rotational movement. The spiral again is constructed of the directional channel weave 49 that is formed into shape by the support rods 63 and the support cables 64. The support rods and cables 63, 64 are constructed of non-corrosive materials chosen for their design composition. This skeletal spiral turbine is connected to the traditional rotational shaft 29 by the means of the center point 61 being attached to the rotational shaft 29.

Figure 25:
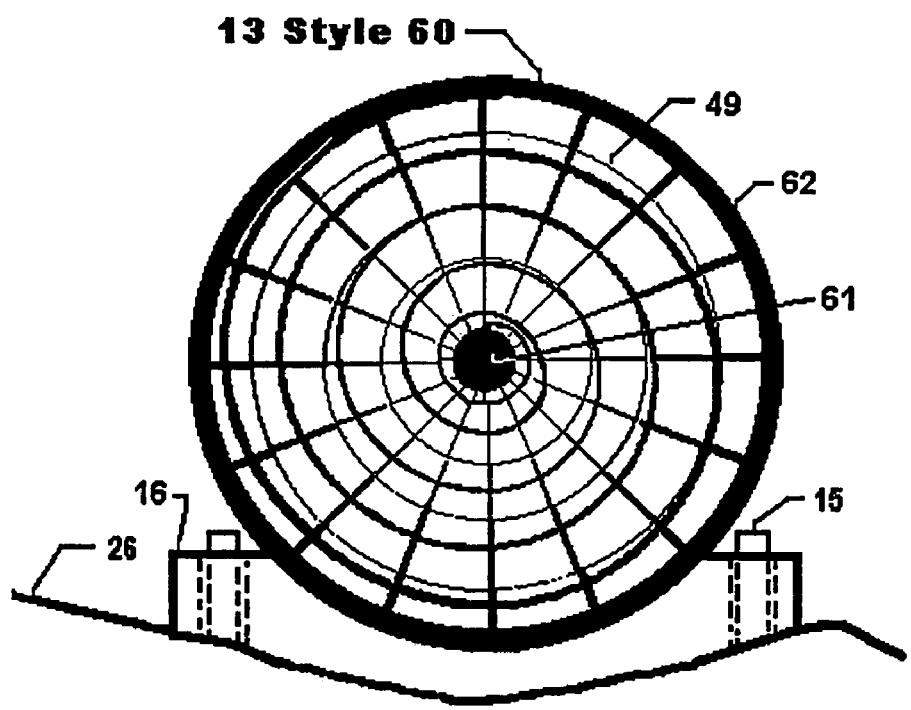
FIG. 25 is the front view of the Skeletal Spiral Turbine style of FIG. 24.

FIG. 25 is the front view of the Skeletal Spiral Turbine 60. This view shows the spiral effect from the center point 61, that is pointed toward the oncoming current 17, toward the outside reinforced edges 62. The current flow 17 is converted to rotational force that turns the rotational shaft 29 which powers the coupled generator, either 12 or 38. The spiral is constructed of the weave of directional cannels 49. To reinforce the spirals flat surfaces and keep them angled towards the ocean current 17 flow, an arrangement of support rods 63 and cables 64 have been employed. The skeletal nature of this turbine/propeller decreases the weight and allows for more surface area to be used, which equals more rotational torque for the same expenditure in materials.

Figure 26:
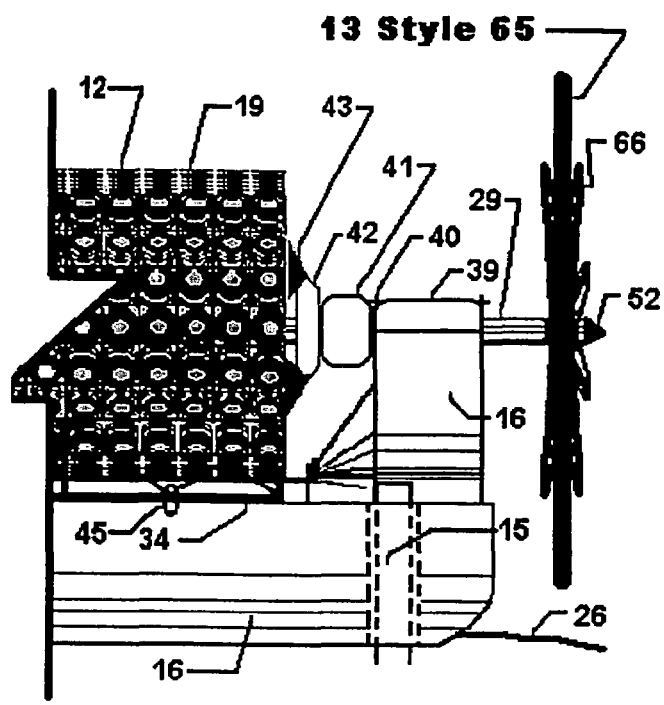
FIG. 26 is the side view of the Multiple Three Blade Configuration style.

FIG. 26 is the side view of the Multiple Three Blade Configuration 13 style 65. This design is based on the common wind turbine blade design with the new feature of multiple additional blade sets. The additional sets of turbine blades captures more of the water current's 17 energy and by being used in multiple sets, slows down the rotational requirements of the system as a whole. Remember our goal is large slow moving rotational blades imposing large amounts of torque to the rotational shaft 29. The blades 66 are constructed of non-corrosive materials and be shaped to impart rotational motion from a frontal current flow.

Figure 27:
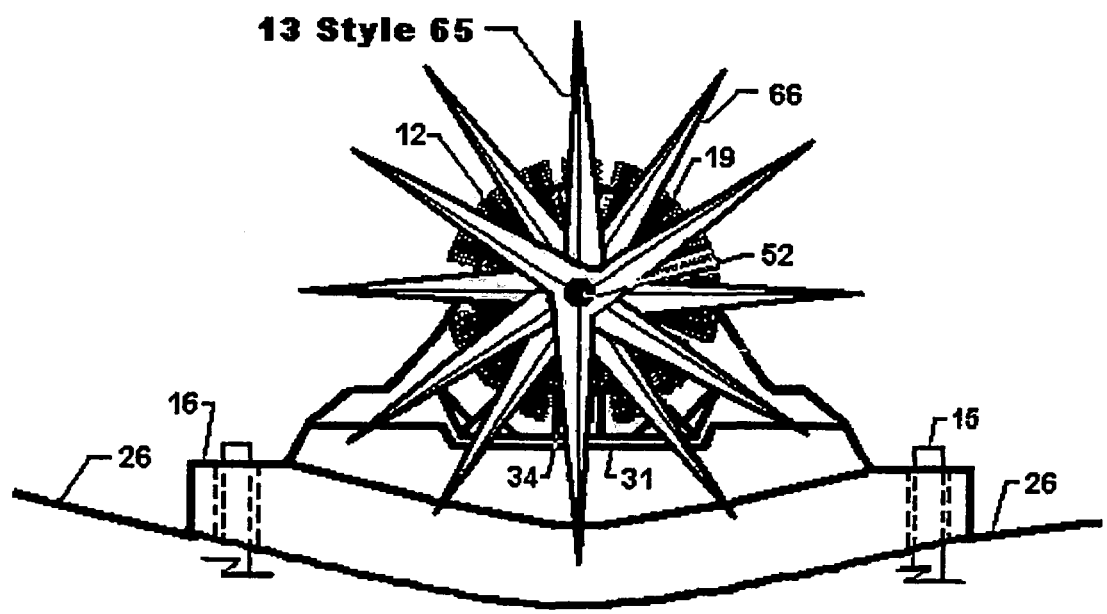
FIG. 27 is the front view of the Multiple Three Blade Configuration style of FIG. 26.

FIG. 27 is the front view of the Multiple Three Blade Configuration 13 style 65. The internally supported electric generator 12 is visible behind the multiple blades 66. The pre-manufactured concrete cradle 16 and the cradle piles 15 are also visible in the rear of this view.

A great deal of time has been spent looking at the propulsion (turbine blade/propeller 13), component for these electric generators 12 and 38. Up to this invention, there has not been a need for a completely submerged rotational turbine blade/propeller 13, unit to turn a completely immersed power-producing electric generator 12 and 38. Further selection for the final type and style of the turbine blade/propeller 13 units are made based on specific conditions for each electric generator 12 or 38 placed within each Hydro-Electric Farm.

What is claimed is:

1. An underwater hydro-electric generator assembly for use in a hydro-electric farm comprising:
    an electrical generator portion coupled to a turbine/blade propeller portion,
    wherein surfaces of components exposed to the water for each portion are coated with a non-conductive, heat dissipating, anti-fouling and water specific protective coating, and
    wherein the electric generator portion includes a brush-less rotator assembly, the brush-less rotator assembly comprising:
        a transmitting ring around a turbine blade/propeller shaft, the transmitting ring having circumferentially spaced-apart transmit nodes;
        a reception ring having circumferentially spaced-apart reception nodes, said reception nodes being connected to reception tabs which are embedded into windings of electromagnets of a rotator electromagnet assembly of the electric generator portion; and
        a protective spacer ring circumferentially located between the transmitting ring and the reception ring, the protective spacer ring having circumferentially spaced-apart apertures aligned with the transmit nodes and the reception nodes,
    wherein electrical charges required for the electromagnets to maintain their polarity is fired between the transmitting nodes and the reception nodes through the protective spacer ring apertures letting the water provide the electrical connection between, and
    wherein the water can flow through the electric generator portion between the rotator electromagnet assembly and a stator field winding assembly and through spaces in each of said rotator electromagnet assembly and said stator field winding assembly.

2. The underwater hydroelectric generator assembly according to claim 1, wherein said hydroelectric generator assembly further comprises:
    a cradle rotational shaft mounting module on each side of the electrical generator portion, each mounting module including a mounting module release mechanism which secures a turbine blade/propeller shaft to the cradle;
    a shaft rotational gear up unit located adjacent one of said mounting modules on the turbine blade/propeller portion of the hydroelectric generator assembly; and
    a rotational shaft stabilizer mounted on the shaft and on both sides of the electrical generator portion of the hydroelectric generator assembly,
    wherein the mounting module, the shaft rotational gear up unit and the rotational shaft stabilizer are in contact with the turbine blade/propeller shaft.

3. The underwater hydroelectric generator assembly according to claim 2, further comprising:
    a plurality of magnetic force support points mounted along the turbine blade/propeller shaft as required to support the turbine blades/propellers and turbine blade/propeller shaft, the gear up unit and a rotator assembly of the electrical generator portion of the hydroelectric generator assembly.

4. The underwater hydroelectric generator assembly according to claim 3, wherein said plurality of magnetic force support points each comprise:
    an outer electromagnetic ring having an induced electromagnetic polarity;
    an outer ring magnet control and power wiring;
    an inner electromagnetic ring having an induced electromagnetic polarity;
    a water passage between the outer and inner electromagnetic rings;
    inner ring control wiring; and
    a turbine blade/propeller shaft coupler,
    wherein the shaft stabilizer units and the rotational shaft mounting module capture the outer ring's electromagnets and holds them in place, and wherein the induced polarities of the inner and outer rings creates a polarity of an inner side of the outer ring which is the same as a polarity of an outer side of the inner ring.

5. The underwater hydroelectric generator assembly according to claim 1, wherein the turbine blade/propeller portion includes blade propellers formed as an open weave bladed windmill arrangement, the blade propellers further having directional enhancers along a perimeter of each blade propeller, the weave arrangement comprising structural channels that direct the water in an altered direction as the water passes through and over a face of each channel, so as to give the blade propellers a rotational force, wherein each blade propeller is positioned in relationship with a neighboring blade propeller so as to overlap each other.

6. The underwater hydroelectric generator assembly according to claim 1, wherein the turbine blade/propeller portion includes two or more layers of three or more blade propellers, each blade propeller being pitched and having an open weave arrangement comprising structural channels that direct the water in an altered direction as the water passes through and over a face of each channel, so as to give the blade propellers a rotational force, wherein each blade propeller is positioned in relationship with a neighboring forward or aft blade propeller so as to overlap each other.

7. The underwater hydro-electric generator assembly according to claim 1, wherein the turbine blade/propeller portion includes blade propellers arranged in a conventional box blade weave arrangement, a protective circular cage around the turbine blade/propeller assembly, the circular cage having openings serving as means for directing the flow of water against the blade propellers, structural channels in each blade propeller that direct the water in an altered direction as the water passes through and over a face of each channel, so as to give the blade propellers a rotational force, wherein each blade propeller is positioned in relationship with a neighboring blade propeller so as to overlap each other.

8. The underwater hydro-electric generator assembly according to claim 1, wherein the turbine blade/propeller portion includes a plurality of solid vane propellers arranged in a conventional fan arrangement, a protective circular cage around the turbine blade/propeller assembly, the circular cage having openings serving as means for directing the flow of water against the blade propellers.

9. The underwater hydroelectric generator assembly according to claim 1, wherein the turbine blade/propeller portion comprises a skeletal spiral turbine rotational assembly, said spiral turbine rotational assembly formed in an increasing spiral form from a center point on a rotational shaft of the electrical generator assembly and spiraling radially outward toward the electrical generator portion of the electrical generator assembly and ending in a circular shaped outer edge, the spiral form further being angled to optimally direct the flow of water toward the outer edge of the spiral form thereby converting a directed force of the flow of water into rotational movement of the spiral turbine rotational assembly, the spiral turbine rotational assembly further having spaced-apart longitudinal support rods extending from the outer edge to an intermediate portion of the spiral form and spaced-apart support cables extending from the outer edge to an attachment location adjacent the center point, the longitudinal support rods and the support cables in combination forming a directional weave to direct the flow of water toward the spiral form and the outer edge.

10. The underwater hydro-electric generator assembly according to claim 1, wherein the turbine blade/propeller portion includes a plurality of three bladed turbine propellers, each three bladed turbine propeller being in a staggered arrangement from the other three bladed turbine propellers, and each propeller being formed in a conventional wind turbine design.

* * * * *